United States Patent
Hanni

(10) Patent No.: US 12,278,714 B1
(45) Date of Patent: Apr. 15, 2025

(54) RF DISTORTION ANALYSIS AND GAIN COMPRESSION CHARACTERIZATION BASED ON WAVEFORM CREATION

(71) Applicant: Keysight Technologies, Inc., Santa Rosa, CA (US)

(72) Inventor: Mark Hanni, Colorado Springs, CO (US)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 133 days.

(21) Appl. No.: 17/975,326

(22) Filed: Oct. 27, 2022

Related U.S. Application Data

(63) Continuation-in-part of application No. 17/971,317, filed on Oct. 21, 2022, now Pat. No. 12,095,600.

(51) Int. Cl.
*H04L 25/02* (2006.01)
*H04B 17/15* (2015.01)

(52) U.S. Cl.
CPC .......... *H04L 25/0202* (2013.01); *H04B 17/15* (2015.01)

(58) Field of Classification Search
CPC .................... H04L 25/0202; H04B 17/15
See application file for complete search history.

(56) References Cited

U.S. PATENT DOCUMENTS

| | | | |
|---|---|---|---|
| 6,484,111 B1 * | 11/2002 | Nara .................... | G01R 23/16 702/77 |
| 8,615,382 B2 | 12/2013 | Dobyns et al. | |
| 8,666,324 B2 | 3/2014 | Otani et al. | |
| 9,800,449 B2 * | 10/2017 | Yensen ............... | H04B 7/0817 |
| 10,379,162 B1 * | 8/2019 | Okuyama ........ | G01R 31/31903 |
| 11,428,776 B2 | 8/2022 | Branstorfinger | |
| 2018/0006738 A1 * | 1/2018 | Stampalia ............. | H04B 17/14 |
| 2021/0081630 A1 * | 3/2021 | Pickerd ................ | G06F 17/141 |
| 2021/0270877 A1 * | 9/2021 | Owen .................... | G01R 23/16 |
| 2022/0045699 A1 * | 2/2022 | Germer ............... | H04B 1/0039 |
| 2022/0045774 A1 | 2/2022 | Steffens et al. | |

OTHER PUBLICATIONS

Machine Translation of CN 103560841 A. (Year: 2014).*

* cited by examiner

*Primary Examiner* — Jean B Corrielus

(57) ABSTRACT

A controller includes a memory that stores instructions; and a processer that executes the instructions. When executed by the processor, the instructions cause the controller to provide a waveform based on an IQ baseband waveform data array; initialize a signal analysis device to acquire a modulated radio frequency signal which is based on the IQ baseband waveform data array; and control the signal analysis device to measure the modulated radio frequency signal which is based on the IQ baseband waveform data array.

20 Claims, 14 Drawing Sheets

RF DISTORTION ANALYSIS AND GAIN COMPRESSION CHARACTERIZATION BASED ON WAVEFORM CREATION

CROSS-REFERENCE TO RELATED APPLICATIONS

The present application is a continuation-in-part of commonly owned U.S. patent application Ser. No. 17/971,317 filed on Oct. 21, 2022. The present application claims priority is claimed under 35 U.S.C. § 120 from U.S. patent application Ser. No. 17/971,317. The entire disclosure of U.S. patent application Ser. No. 17/971,317 is specifically incorporated herein by reference.

BACKGROUND

Modern demands for wireless communication applications have resulted in usage of increasingly higher frequencies of the radio frequency (RF) spectrum. The usage of increasingly higher frequencies facilitates higher data bandwidths and speeds. These communication applications have precipitated development of an entire class of commercial component devices that can be described as digital-to-RF data converting devices and/or RF-to-digital data converting devices. These data converting devices may include a single component with an RF input and digital output using an analog-to-digital converter (ADC) and/or an RF output and digital input using a digital-to-analog converter (DAC). These cross-domain devices have gained commercial popularity, and may include, for example, RF and digital components of a transceiver chip integrated into a single package. The advancements of communication applications at higher frequencies results in a need for closer integration of the digital components and RF components of devices in order to achieve required performance metrics.

Digital-RF converting devices have a combination of RF front end and a digital baseband back end. These types of digital-RF converting devices are devices that integrate RF components with digital components as a combined RF-digital system. These systems can be used for receiving RF signals and converting the received signal to a digital representation and/or transmitting a RF waveform based on a digital description of the waveform.

With the reduction in component size, digital-RF data converting devices are not easily characterized using traditional vector network analyzer (VNA) methods. Whereas digital-RF converting devices for transmitters or receivers may have only a single RF input connection point or output connection point and a single digital input connection point or output connection point, digital-RF transceivers combine both the receiving and transmitting into a single package with a common digital input/output interface point and both an RF receiver input and an RF transmitter output. However, there is no current mechanism for vector network analyzers or similar test equipment to characterize either digital-RF converting devices or digital-RF transceivers.

Characterization of modulation distortion parameters is important to understand how digital-RF converting devices and digital-RF transceivers perform under modulated conditions. It is also important to characterize how these devices perform when operated at or around the point of compression. However, digital-RF converting devices and digital-RF transceivers have integrated digital or analog amplification and attenuation capabilities. The digital-RF converting devices and digital-RF transceivers are compact devices that directly mate the RF front-end components with the digital baseband back-end components in a single chip. Traditional vector network analyzer measurement techniques are difficult to use with these devices as such measurement techniques typically rely on having access to both RF input connection points and RF output connection points, and are able to measure the response of a device under test (DUT) relative to stimulus from the vector network analyzer in the RF domain. Such measurements are not currently feasible for digital-RF receiver devices given the absence of access to both RF input and RF output connection points as well as the inability to continuously sample the input or output RF stimulus or response in the system. The resultant measurements techniques currently used rely on a modulated signal that may or may not drive the device under test into non-linear operating conditions Accordingly, new measurement mechanisms must be developed for digital-RF converting devices and digital-RF transceivers that do not rely on simultaneous acquisition of an RF response to a known RF stimulus.

SUMMARY

According to an aspect of the present disclosure, a controller includes a memory that stores instructions; and a processer that executes the instructions. When executed by the processor, the instructions cause the controller to provide a waveform based on an IQ baseband waveform data array; initialize a signal analysis device to acquire a modulated RF signal which is based on the IQ baseband waveform data array; and control the signal analysis device to measure the modulated RF signal which is based on the IQ baseband waveform data array.

According to another aspect of the present disclosure, a tangible non-transitory computer-readable storage medium stores a computer program. The computer program, when executed by a processor, causes a system to provide a waveform based on an IQ baseband waveform data array; initialize a signal analysis device to acquire a modulated RF signal which is based on the IQ baseband waveform data array; and control the signal analysis device to measure the modulated RF signal which is based on the IQ baseband waveform data array.

According to another aspect of the present disclosure, a system includes a memory that stores instructions; and a processer that executes the instructions. When executed by the processor, the instructions cause the system to: provide a waveform based on an IQ baseband waveform data array; initialize a signal analysis device to acquire a modulated RF signal which is based on the IQ baseband waveform data array; and control the signal analysis device to measure the modulated RF signal which is based on the IQ baseband waveform data array.

BRIEF DESCRIPTION OF THE DRAWINGS

The example embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION

Figure 1A:
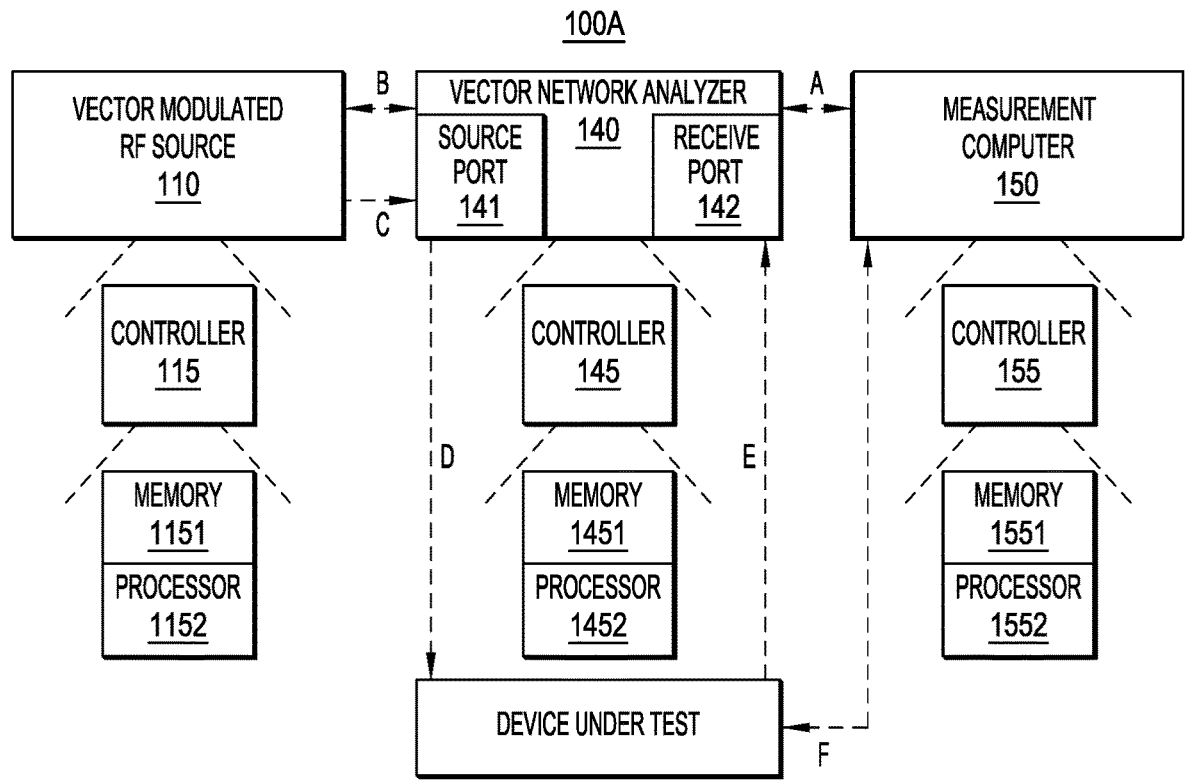
FIG. 1A illustrates a system for RF distortion analysis and gain compression characterization based on waveform creation, in accordance with a representative embodiment.

In the following detailed description, for the purposes of explanation and not limitation, representative embodiments disclosing specific details are set forth in order to provide a thorough understanding of embodiments according to the present teachings. However, other embodiments consistent with the present disclosure that depart from specific details disclosed herein remain within the scope of the appended claims. Descriptions of known systems, devices, materials, methods of operation and methods of manufacture may be omitted so as to avoid obscuring the description of the representative embodiments. Nonetheless, systems, devices, materials and methods that are within the purview of one of ordinary skill in the art are within the scope of the present teachings and may be used in accordance with the representative embodiments. It is to be understood that the terminology used herein is for purposes of describing particular embodiments only and is not intended to be limiting. Definitions and explanations for terms herein are in addition to the technical and scientific meanings of the terms as commonly understood and accepted in the technical field of the present teachings.

It will be understood that, although the terms first, second, third etc. may be used herein to describe various elements or components, these elements or components should not be limited by these terms. These terms are only used to distinguish one element or component from another element or component. Thus, a first element or component discussed below could be termed a second element or component without departing from the teachings of the inventive concept.

As used in the specification and appended claims, the singular forms of terms 'a', 'an' and 'the' are intended to include both singular and plural forms, unless the context clearly dictates otherwise. Additionally, the terms "comprises", and/or "comprising," and/or similar terms when used in this specification, specify the presence of stated features, elements, and/or components, but do not preclude the presence or addition of one or more other features, elements, components, and/or groups thereof. As used herein, the term "and/or" includes any and all combinations of one or more of the associated listed items.

The present disclosure, through one or more of its various aspects, embodiments and/or specific features or sub-components, is thus intended to bring out one or more of the advantages as specifically noted below.

Waveforms created for systems and methods described herein may be used to characterize gain compression characteristics of a device under test and/or phase compression characteristics of a device under test. For example, the waveforms may be used to characterize behavior exhibited by digital-RF converting devices and digital-RF transceivers with RF components and digital interfaces. The waveforms described herein provide an ability to drive cross-domain devices into compression utilizing an IQ waveform. The Devices under test may be representative of cell phones such as smart phones, as well as other types of communication devices and components of such cell phones and other types of communication devices.

FIG. 1 illustrates a system for RF distortion analysis and gain compression characterization based on waveform creation, in accordance with a representative embodiment.

The system 100A in FIG. 1A includes a vector modulated RF source 110, a vector network analyzer 140 and a measurement computer 150. The system 100A in FIG. 1A is configured to test a device under test as shown. As shown, the vector modulated RF source 110 includes a controller 115, and the controller 115 includes a memory 1151 and a processor 1152. The vector network analyzer 140 includes a source port 141, a receive port 142 and a controller 145, and the controller 145 includes a memory 1451 and a processor 1452. The measurement computer 150 includes a controller 155, and the controller 155 includes a memory 1551 and a processor 1552. Each of the vector modulated RF source 110, the vector network analyzer 140 and the measurement computer 150 include a controller with a memory that stores instructions and a processor that executes the instructions. The controllers are used implement the methods described herein.

A memory described herein (e.g., memory 1151, memory 1451, and/or memory 1551) may include a main memory and/or a static memory, where such memories may communicate with each other and other elements of a controller via one or more buses. The memory stores instructions used to implement some or all aspects of methods and processes described herein. The memory may be implemented by any number, type and combination of random access memory (RAM) and read-only memory (ROM), for example, and may store various types of information, such as software algorithms, which serve as instructions, which when executed by a processor cause the controller to perform various steps and methods according to the present teachings. Furthermore, updates to the methods and processes described herein may also be stored in memory.

The various types of ROM and RAM may include any number, type and combination of computer readable storage media, such as a disk drive, flash memory, an electrically programmable read-only memory (EPROM), an electrically erasable and programmable read only memory (EEPROM), registers, a hard disk, a removable disk, tape, compact disk read only memory (CD-ROM), digital versatile disk (DVD), floppy disk, Blu-ray disk, a universal serial bus (USB) drive, or any other form of storage medium known in the art. The memory 1151, memory 1451 and memory 1551 are each a tangible storage medium for storing data and executable software instructions, and are non-transitory during the time software instructions are stored therein. As used herein, the term "non-transitory" is to be interpreted not as an eternal characteristic of a state, but as a characteristic of a state that will last for a period. The term "non-transitory" specifically disavows fleeting characteristics such as characteristics of a carrier wave or signal or other forms that exist only transitorily in any place at any time. The memory 1151, memory 1451 and memory 1551 may store software instructions and/or computer readable code (collectively referred to as 'instructions') that enable performance of various functions of the system 100A or other systems described herein for other embodiments. The memory 1151, memory 1451 and memory 1551 may be secure and/or encrypted, or unsecure and/or unencrypted.

"Memory" is an example of computer-readable storage media, and should be interpreted as possibly being multiple memories. The memory for instance may be multiple memories or databases local to the system 100A, and/or distributed amongst multiple computer systems or computing devices, or disposed in the 'cloud' according to known components and methods. A computer readable storage medium is defined to be any medium that constitutes patentable subject matter under 35 U.S.C. § 101 and excludes any medium that does not constitute patentable subject matter under 35 U.S.C. § 101. Examples of such media include non-transitory media such as computer memory devices that store information in a format that is readable by a computer or data processing system. More specific examples of non-transitory media include computer disks and non-volatile memories.

The controller 115, controller 145 and controller 155 described herein are representative of one or more processing devices, and are configured to execute software instructions stored in memory to perform functions as described in the various embodiments herein. The processor 1152, processor 1452 and processor 1552 may be implemented by field programmable gate arrays (FPGAs), application specific integrated circuits (ASICs), systems on a chip (SOC), a general purpose computer, a central processing unit, a computer processor, a microprocessor, a graphics processing unit (GPU), a microcontroller, a state machine, programmable logic device, or combinations thereof, using any combination of hardware, software, firmware, hard-wired logic circuits, or combinations thereof. Additionally, any processing unit or processor herein may include multiple processors, parallel processors, or both. Multiple processors may be included in, or coupled to, a single device or multiple devices.

The term "processor" as used herein encompasses an electronic component able to execute a program or machine executable instruction. References to a device comprising "a processor" should be interpreted to include more than one processor or processing core, as in a multi-core processor. A processor may also refer to a collection of processors within a single computer system or distributed among multiple computer systems, such as in a cloud-based or other multi-site application. The term computing device should also be interpreted to include a collection or network of computing devices each including a processor or processors. Modules have software instructions to carry out the various functions using one or multiple processors that may be within the same computing device or which may be distributed across multiple computing devices.

The systems used to create the waveforms described herein may comprise computers such as a 64-bit computer running Windows 10, and the waveforms may be used in testing of devices under test by signal analysis devices such as vector network analyzers. In some embodiments, the measurement computer 150 may comprise a laptop computer or a personal computer such as a 64-bit personal computer running Windows 10. The measurement computer 150 may run a measurement software program such as a wideband transceiver analysis software program. The wideband transceiver analysis software may interface with the vector network analyzer 140 so that the measurement computer 150 in FIG. 1A may be used to control some operations of the vector network analyzer 140. For example, the wideband transceiver analysis software may be stored in the memory 1551, may be executed by the processor 1552, and at step A may upload a waveform to the vector network analyzer 140. Subsequently, the measurement computer 150 may control the vector network analyzer 140 to perform measurements of modulated RF signals from the device under test and data acquisition from the device under test. For example, the wideband transceiver analysis software of the measurement computer 150 may control vector signal analysis software of the vector network analyzer 140.

The controller 155 may perform some of the operations described herein directly and may implement other operations described herein indirectly. For example, the controller 155 may indirectly control operations such as by providing instructions to the controller 145. The controller 155 may directly control other operations such as logical operations performed by the processor 1552 executing instructions from the memory 1551 based on input received from electronic elements and/or users via interfaces. Accordingly, the processes implemented by the controller 155 when the processor 1552 executes instructions from the memory 1551 may include steps not directly performed by the controller 155. The controller 115 and the controller 145 may similarly perform some aspects of methods described herein directly, and other aspects of methods described herein indirectly.

The vector network analyzer 140 may interface with and upload the waveform to the vector modulated RF source 110 at step B. The vector modulated RF source 110 may generate a modulated RF signal based on the waveform and transmit the modulated RF signal to the device under test. In some embodiments, the vector modulated RF source 110 may be integrated with and internal to the vector network analyzer 140.

The vector modulated RF source 110 provides a modulated RF signal to a source port 141 of the vector network analyzer 140 at step C. The modulated RF signal is modulated with the waveform provided from the measurement computer 150 to the vector network analyzer 140, and from the vector network analyzer 140 to the vector modulated RF source 110. At step D, the vector network analyzer 140 outputs the modulated RF signal to a RF receiver of the device under test. The RF transmitter of the device under test outputs the modulated RF signal to the receive port 142 of the vector network analyzer at step E.

The measurement computer 150 also interfaces with a digital input/output of the device under test as represented by step F in FIG. 1A. Notwithstanding the sequential labelling of step F, functions corresponding to step F may be performed any one or all of steps A, B, C, D and E in some embodiments based on FIG. 1A. The device under test may include a command and control interface such as an application program interface to handle calls from the wideband transceiver analysis software program running on the measurement controller 150 or vector network analyzer 140. Digitized reception data from the device under test may be transferred to the vector network analyzer 140 via a comma-separated values (CSV) data file created by the device under test application program interface.

The device under test may include a command and control interface such as an application program interface to handle calls from the measurement controller 150. Digitized reception data from the device under test may be transferred to the measurement computer 150 via a CSV data file created by the device under test application program interface, and the CSV data file may be uploaded to the vector network analyzer 140. In the transmit case, the ideal waveform may be uploaded to the vector network analyzer 140 via the wideband transceiver analysis software in the measurement computer 150 as the reference waveform. The device under test application program interface may upload the transmit waveform to play through calls from the wideband transceiver analysis software feature.

In embodiments based on FIG. 1A, the controller 155 includes a memory that stores instructions and a processor that executes the instructions. When executed by the processor, the instructions cause the controller 155 to provide a waveform based on an IQ baseband waveform data array to the vector network analyzer 140. The vector network analyzer 140 is a signal analysis device, and the controller 155 may control the vector network analyzer 140 as a signal analysis device to acquire a modulated RF signal which is based on the IQ baseband waveform data array from the device under test. The controller 155 may control the vector network analyzer as a signal analysis device to measure the modulated RF signal which is based on the IQ baseband waveform data array.

Figure 1B:
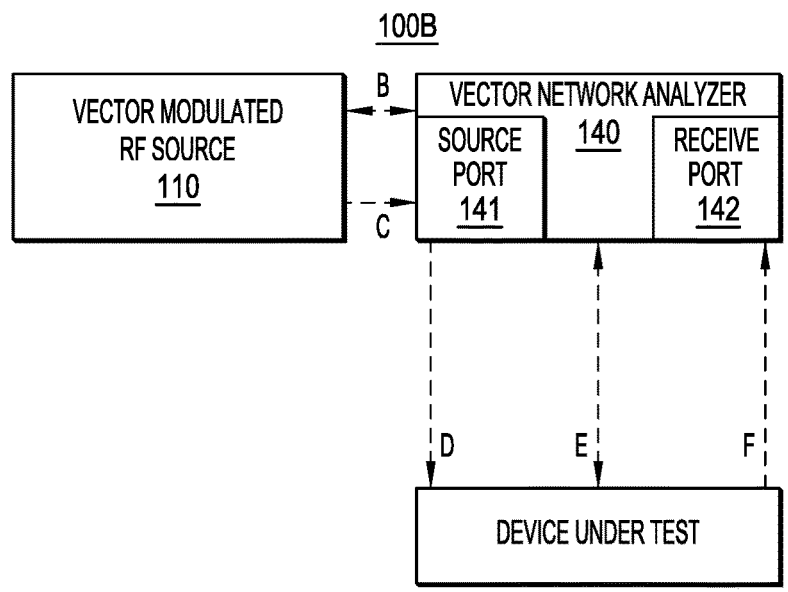
FIG. 1B illustrates another system for RF distortion analysis and gain compression characterization based on waveform creation, in accordance with a representative embodiment.

FIG. 1B illustrates another system for RF distortion analysis and gain compression characterization based on waveform creation, in accordance with a representative embodiment.

In embodiments based on FIG. 1B, the functionality attributed to the measurement computer 150 in FIG. 1A may be integrated with and performed by a signal analysis device such as the vector network analyzer 140.

The system in FIG. 1B includes the vector modulated RF source 110 and the vector network analyzer 140. In FIG. 1B, the functionality attributed to the measurement computer 150 in FIG. 1A is implemented by the vector network analyzer 140. The vector network analyzer 140 may interface with and upload the waveform to the vector modulated RF source 110 at step B. The vector modulated RF source 110 provides a modulated RF signal to a source port 141 of the vector network analyzer 140 at step C. The modulated RF signal is modulated with the waveform provided from the vector network analyzer 140 to the vector modulated RF source 110. At step D, the vector network analyzer 140 outputs the modulated RF signal to the device under test. The RF transmitter of the device under test outputs the modulated RF signal to the receive port 142 of the vector network analyzer at step E.

In FIG. 1B, the vector network analyzer 140 may also interface with a digital input/output of the device under test as represented by step F in FIG. 1B. Notwithstanding the sequential labelling of step F, functions corresponding to step F may be performed any one or all of steps A, B, C, D and E in some embodiments based on FIG. 1B. The device under test may include a command and control interface such as an application program interface to handle calls from the vector network analyzer 140. Digitized reception data from the device under test may be transferred to the vector network analyzer 140 via a CSV data file created by the device under test application program interface.

Figure 1C:
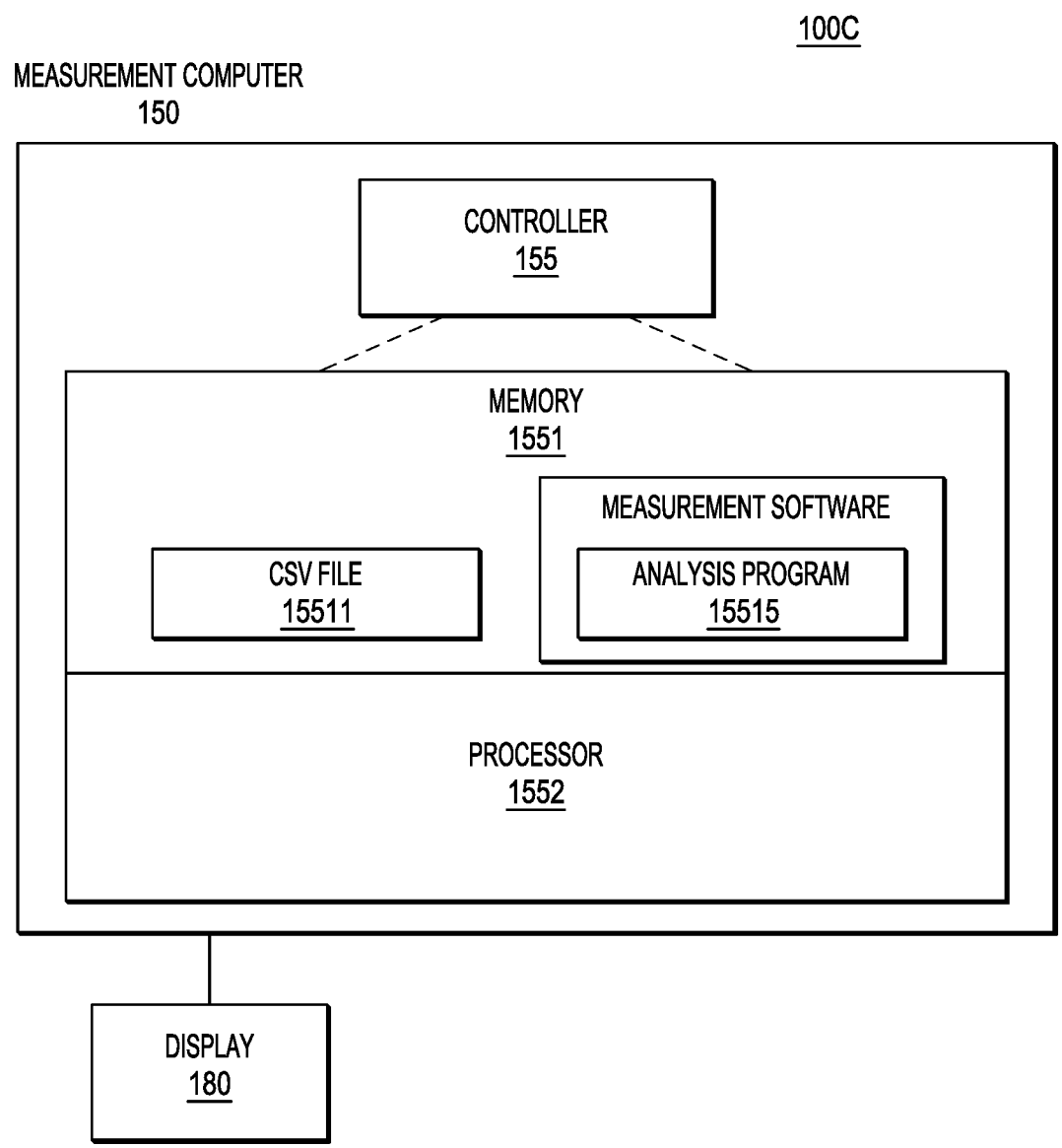
FIG. 1C illustrates another system for RF distortion analysis and gain compression characterization based on waveform creation, in accordance with a representative embodiment.

FIG. 1C illustrates another system for RF distortion analysis and gain compression characterization based on waveform creation, in accordance with a representative embodiment.

The system in FIG. 1C includes a measurement computer 150 and a display 180. The measurement computer 150 may be a stand-alone computer or may be integrated with a vector network analyzer. The measurement computer 150 includes a controller 155, and the controller 155 includes a memory 1551 and a processor 1552. The memory 1551 stores a CSV file 15511 and measurement software including an analysis program 15515. The memory 1551 may store instructions executable by the processor 1552, including but not limited to the measurement software. The CSV file 15511 may comprise digital data for a waveform created by a waveform creator 8515 as described later with respect to FIG. 8. The digital data for a waveform may be transferred upon creation to the measurement computer 150, to a vector network analyzer, and/or to a vector modulated RF source.

Figure 2A:
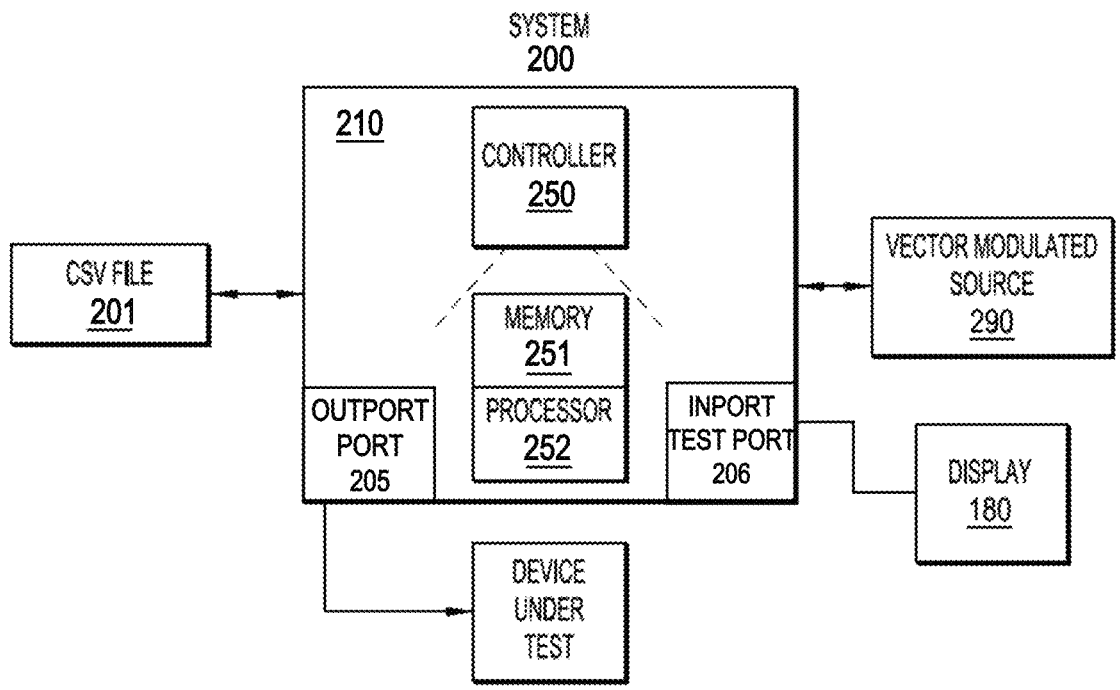
FIG. 2A illustates another system for RF distortion analysis and gain compression characterization based on waveform creation, in accordance with a representative embodiment.

FIG. 2A illustrates another system for RF distortion analysis and gain compression characterization based on waveform creation, in accordance with a representative embodiment.

In FIG. 2A, a system 200A includes an analyzer 210 and a vector modulated source 290. The analyzer 210 includes an output test port 205, an input test port 206 and a controller 250. The controller 250 includes a memory 251 and a processor 252. The memory 251 stores instructions and the processor 252 executes the instructions. A CSV file 201 corresponds to the CSV file 15155 in FIG. 1, and is provided to the analyzer 210 after being created. The system 200A tests the device under test using the CSV file 201 and the vector modulated source 290. For example, the processor 252 may execute instructions to provide the CSV file 201 to the vector modulated source 290.

Figure 9:
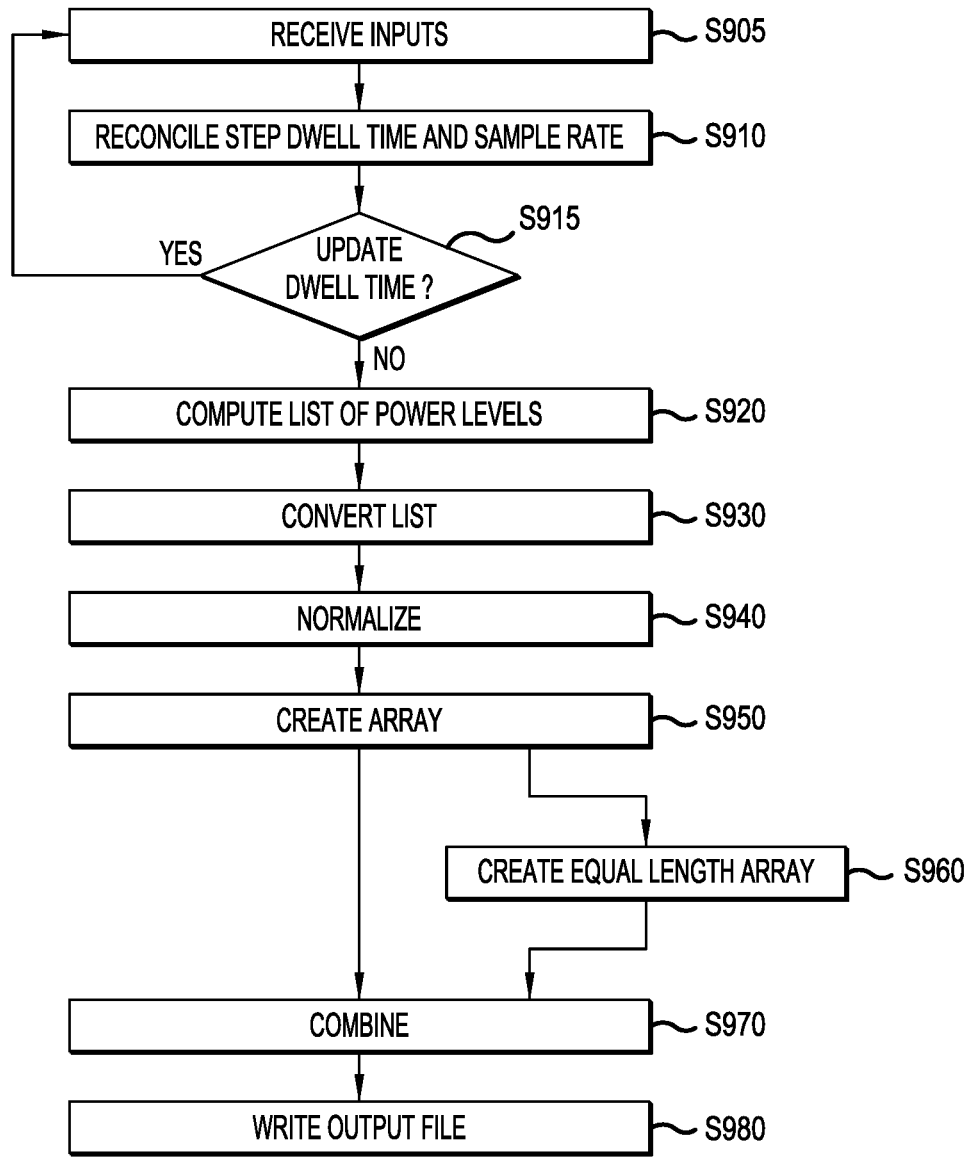
FIG. 9 illustrates a method for waveform creation for RF distortion analysis and gain compression characterization, in accordance with a representative embodiment.

The analyzer 210 is a signal analysis device such as a vector network analyzer or similar type of signal analyzer or vector spectrum analyzer. In embodiments based on FIG. 2A, a device under test may be tested in a receiver mode by the analyzer 210. The CSV file 201 contains a baseband time domain IQ waveform with discrete power steps. FIG. 9 is described below as an example method for creating a baseband time domain IQ waveform. A spectrum analyzer application or a modulation distortion application stored in the memory 251 and executed by the processor 252 may process the CSV file 201 and provide the underlying baseband time domain IQ waveform to the vector modulated source 290. A modulated RF signal processed by the processor 252 may be processed in a spectrum analysis and/or a modulation distortion analysis. The vector modulated source 290 outputs a modulated RF signal based on the baseband time domain IQ waveform to the input test port 206 of the analyzer 210. The input test port 206 may be an element of a RF path. The output test port 205 then outputs the modulated RF signal based on the baseband time domain IQ waveform to the device under test. The device under test receives the modulated RF signal via a RF input.

The vector modulated source 290 may include a memory/processor combination to directly process the CSV file 201. The vector modulated source 290 interprets the waveform sample information in the IQ baseband waveform data array when the IQ baseband waveform data array is provided by the analyzer 210. As a result, the vector modulated source 290 provides a modulated RF signal to the analyzer 210 based on the IQ baseband waveform data array. The analyzer 210 may provide a user with prompts of selections of types of tones for the IQ baseband waveform data array, so that the IQ baseband waveform data array used for the modulated RF signal is based on a selection among options presented by the analyzer 210. In other words, the IQ baseband waveform data array which drives the vector modulated source 290 may be selected from multiple options presented by the analyzer 210.

In the embodiment of FIG. 2A, the analyzer 210 may provide source control and formatting to the vector modulated source 290. The analyzer 210 may also upload the underlying baseband time domain IQ waveform to the vector modulated source 290 for testing the device under test or individual components of the device under test such as a RF amplifier or a RF mixer.

Figure 2B:
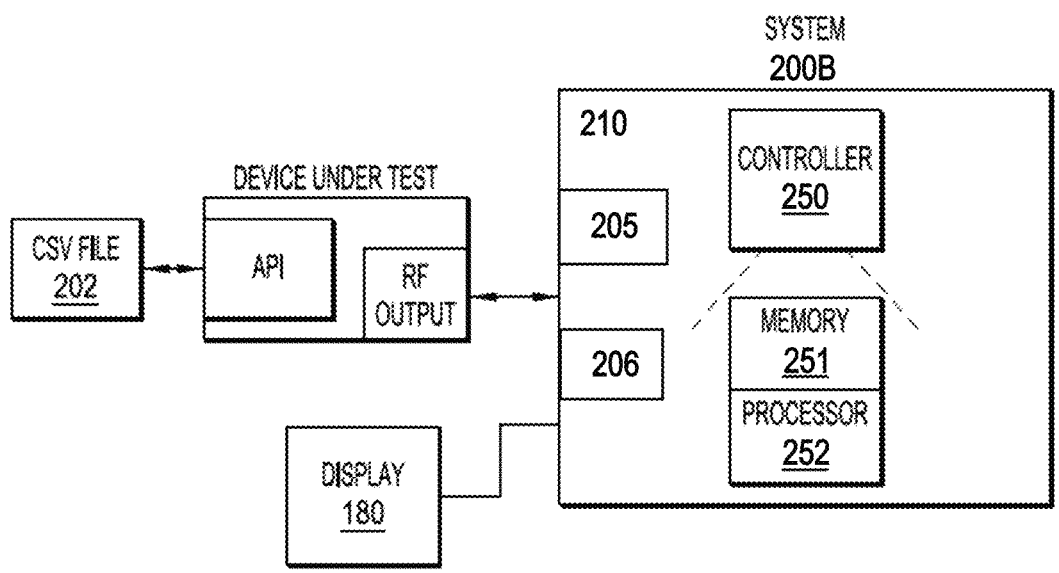
FIG. 2B illustrates another system for RF distortion analysis and gain compression characterization based on waveform creation, in accordance with a representative embodiment.

FIG. 2B illustrates another system for RF distortion analysis and gain compression characterization based on waveform creation, in accordance with a representative embodiment.

In FIG. 2B, a system 200B includes the analyzer 210 from FIG. 2A. The analyzer 210 includes an output test port 205, an input test port 206 and a controller 250. The controller 250 includes a memory 251 and a processor 252. The memory 251 stores instructions and the processor 252 executes the instructions. A CSV file 202 corresponds to the CSV file 15155 in FIG. 1, and is provided to a device under test after being created. The system 200B tests the device under test using the CSV file 202.

In embodiments based on FIG. 2B, a device under test may be tested in a transmitter mode by the analyzer 210. The CSV file 202 contains a baseband time domain IQ waveform with discrete power steps created by the method of FIG. 9 or a similar method. The CSV file is provided to the device under test via an application program interface (API) of the device under test, and the device under test outputs a modulated RF signal based on the baseband time domain IQ waveform to the analyzer 210 via a RF output.

The device under test in FIG. 2B interprets the waveform sample pairs (IQ waveform data) in the CSV file using a digital to analog converter (DAC) to convert the digital information to voltage levels. The device under test then upconverts the IQ waveform data from baseband to a desired RF frequency and outputs the RF signal. This process is similar or identical to how the vector source described earlier operates internally. The device under test interprets the IQ waveform data using the application programmable interface (API) available for the device under test. That is to say, the IQ baseband waveform data array is interpreted by the device under test's software API and hardware such that the device under test provides a modulated RF signal based on the IQ baseband waveform data array.

In FIG. 2B, the IQ baseband waveform data array is configured to be interpreted by the device under test such that the device under test provides a modulated RF signal to the analyzer 210 based on the IQ baseband waveform data array.

In FIG. 2A and FIG. 2B, a modulated RF signal based on the IQ baseband waveform data array is used by the analyzer 210 to characterize at least one of gain compression characteristics of the device under test or phase compression characteristics of the device under test. In FIG. 2A, the modulated RF signal is output by the vector modulated source 290, and in FIG. 2B the modulated RF signal is output by the device under test.

Measurement techniques to characterize the gain and phase compression of a digital-RF data converting device using an IQ waveform provides an ability to characterize gain compression parameters using coherent spectral analysis and a IQ waveform. The various systems and devices in FIG. 1A, FIG. 1B, FIG. 1C, FIG. 2A and FIG. 2B may be used to characterize the gain and phase compression of a digital-RF data converting device in this manner. A spectrum analysis application implemented by a vector network analyzer may link an acquired spectrum with vector signal analysis software. The ability to link the vector signal analysis software with the spectrum acquired by the vector network analyzer enables the ability to use the signal analysis capabilities within the vector signal analysis software while using the vector network analyzer platform as the measurement acquisition engine. By using the vector signal analysis link in the vector network analyzer, the AM/AM or gain compression and AM/PM analysis functions and graphs in the vector signal analysis software are available while the device under test stimulus and response waveforms are being sampled by the vector network analyzer. The gain compression and AM/PM graphs in vector signal analyzer may be used to determine gain compression parameters such as the 1 dB gain compression and the 0.5° phase compression points, respectively.

Figure 3:
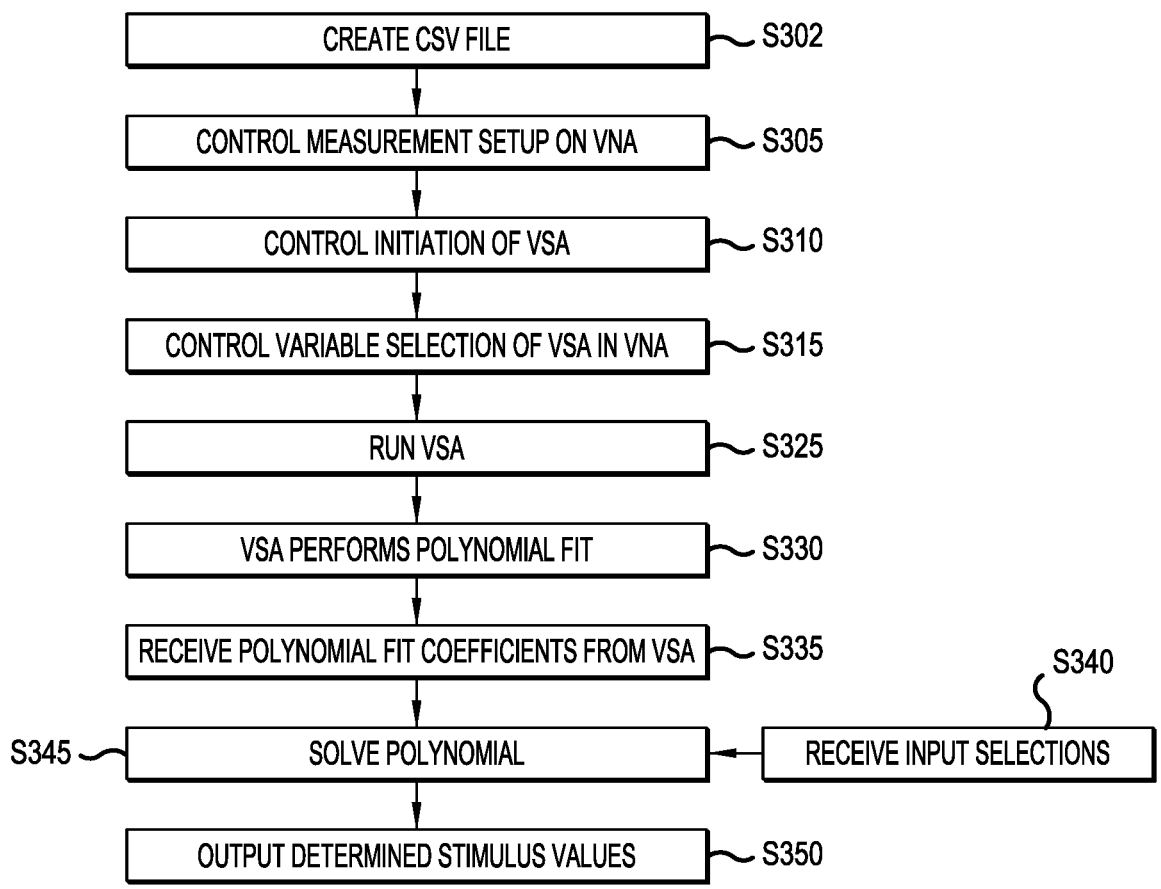
FIG. 3 illustrates a method for RF distortion analysis and gain compression characterization based on waveform creation, in accordance with a representative embodiment.

FIG. 3 illustrates a method for RF distortion analysis and gain compression characterization based on waveform creation, in accordance with a representative embodiment.

The method of FIG. 3 outlines a measurement technique to characterize the gain compression properties of a RF-digital data converting device. Notably, the illustrative method described in connection with FIG. 3 is useful to gain an understanding of the concept and mechanics of how the measurement techniques of the present teachings work.

Figure 10B:
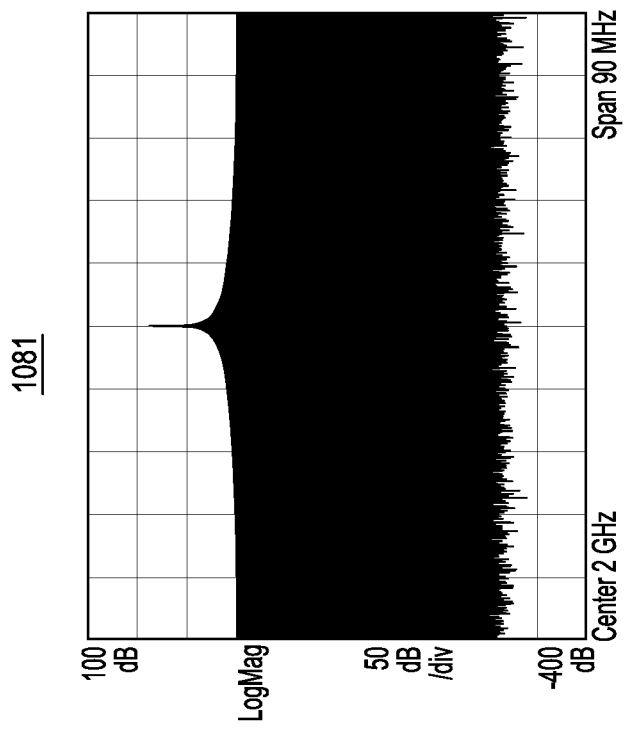
FIG. 10B illustrates a time domain representation of a waveform created via a user interface for RF distortion analysis and gain compression characterization based on waveform creation, in accordance with a representative embodiment.
Figure 10A:
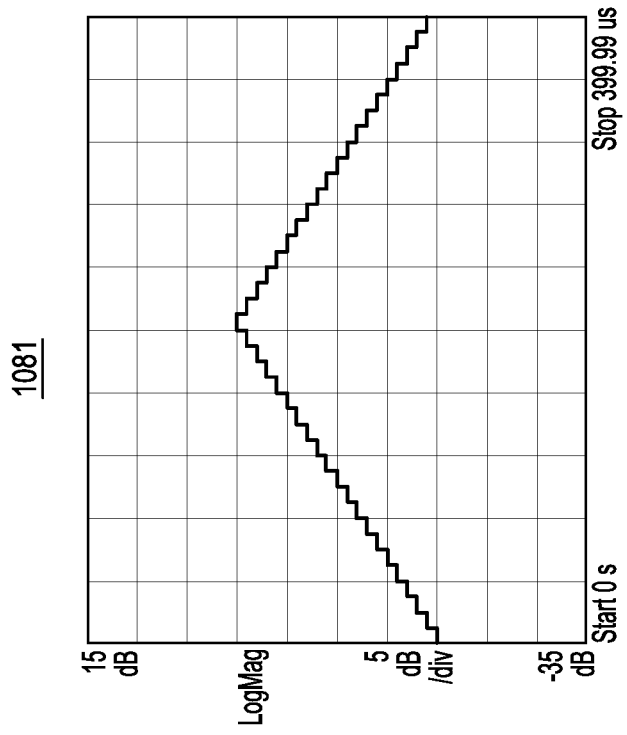
FIG. 10A illustrates a frequency domain representation of a waveform created via a user interface for RF distortion analysis and gain compression characterization based on waveform creation, in accordance with a representative embodiment.

The method of FIG. 3 starts at S302 with creating a CSV file. A method for creating a baseband IQ power step waveform arranged in the CSV file in described in FIG. 9. The waveform may be created at a specific frequency of interest that can be used to drive the waveform into compression. An example of the frequency and time domain representations of such a waveform is shown in FIG. 10A and FIG. 10B. The steps in power of the waveform cause the IQ modulator to modulate the RF source, approximating a stepped power sweep that may be used by a vector network analyzer when measuring gain compression. The user may enter the time length of each power step, the number of power steps, and the change in power between steps. Waveform creator software may then create the waveform given the specified inputs as closely as possible. The creation of the IQ waveform enables the measurement techniques described herein.

At S305, measurement setup is controlled on a vector network analyzer. For example, measurements of a modulated RF signal based on the baseband IQ power step waveform may be setup using a spectrum analyzer measurement application or a modulation distortion measurement application on a vector network analyzer. A modulated RF signal processed in the method of FIG. 3 may processed in a spectrum analysis and/or a modulation distortion analysis. The user may create a spectrum analysis channel on the vector network analyzer, and the modulation waveform will be played back by the vector modulation source.

The vector modulation source may be routed through a connection on the vector network analyzer such that a reference receiver may sample the waveform from the vector modulation source and use this waveform as the reference. Setting the IQ waveform modulation file in the vector network analyzer may automatically enable the coherent spectral analysis features in the vector network analyzer application and configure these spectral analysis features to the waveform. The device under test is attached to a port of the vector network analyzer, and the device under test output is a then attached to another port. For example, a RF amplifier device or a RF mixer may be selected and connected between ports 1 and 2 of a vector network analyzer.

At S310, the vector signal analysis software is launched and controlled. For example, a vector signal analysis program may be started via a link on the vector network analyzer, and the link may be optimized.

At S310, the vector network analyzer handles the launch and setup of the vector signal analysis software as an embedded feature of the vector network analyzer. The vector network analyzer also optimizes the data flow from the vector network analyzer application to the vector signal analysis application. The vector network analyzer spectrum analysis measurement acquisition may be started and the vector source playback begins. The vector signal analysis link feature of the vector network analyzer may be activated and a data link between the vector network analyzer application and the vector signal analysis software running on the vector network analyzer is established. This link may export the vector data acquired by the spectrum analysis application on the vector network analyzer to the vector signal analysis application.

At S315, variable selection of the vector signal analysis software in the vector network analyzer is controlled. The variable selection may include setting up gain compression, an AM/PM graph type and/or an AM/AM graph type in the vector signal analysis software.

At S325, the vector signal analysis software is run. The vector signal analysis software is embedded on the vector network analyzer, and receives the input and output waveform measurement data.

At S330, the vector signal analysis software performs a polynomial fit. The vector signal analysis software automatically sets up and performs polynomial fits to graphs that were set up. at S315.

At S335, the polynomial fit coefficients are received from the vector signal analysis software. As an example, the graph polynomial fit coefficients may be retrieved by the measurement computer 150 from the vector network analyzer 140 in FIG. 1A. Additionally, data from the vector signal analysis software may be retrieved at S335.

At S340, input selections are received. The inputs are supplied by a user, such as a user of the measurement computer 150 in FIG. 1A. The inputs may include a desired gain compression analysis value or a desired gain expansion analysis value, and a desired phase compression analysis value or a desired phase expansion analysis value. The obtained inputs may correspond to at least one of a target gain value or a target phase value.

At S345, the polynomial is solved. The polynomial is solved for the values supplied as inputs by the user. For example, the polynomial may be solved for a 1 dB gain compression point or a 1° phase compression/expansion point. The polynomial may be solved using a mathematical function executed by the measurement computer 150. The target gain value or the target phase value corresponding to the obtained inputs from S340 may be applied to graph polynomial fit coefficients. Notably, the polynomial fit coefficients are determined at S335. The polynomial solved at S345 for the user inputs may be defined by the fit coefficients obtained using the VSA in S335.

At S350, determined stimulus values are output. The stimulus values determined at S345 may be reported to a user of the measurement computer 150 via a user interface mechanism. Alternatively, the stimulus values determined at S345 may be reported to a user of the vector network analyzer 140 in FIG. 1B.

Using the method of FIG. 3, in the case of a RF to digital device such as an analog to digital converter (ADC): the digital data from the device under test may comprise an output waveform, and may be transferred to the vector network analyzer device under test (output waveform) is transferred to the vector network analyzer application. And the input waveform is sampled by the vector network analyzer reference receivers. In the case of the digital to RF device (DAC), the ideal waveform (input waveform) may be loaded into the vector network analyzer application as the reference waveform. The output waveform from the device under test is sampled by the vector network analyzer measurement receiver.

In the method of FIG. 3, once the vector signal analyzer software is available the vector network analyzer may be instructed to auto-set the vector signal analyzer link parameters to automatically synchronize and configure the spectral analysis settings such as resolution number of points in the vector signal analysis application with the settings on the vector network analyzer. The vector signal analysis software may then be configured to display the gain compression and AM/PM graphs. Once these graphs are available, the user may interpret the data presented to determine gain compression properties such as gain and phase compression points.

The waveform created using the algorithm described in FIG. 9 and the measurement algorithm described above for FIG. 3 may be used to determine the gain and phase compression points of devices under test.

Figure 4:
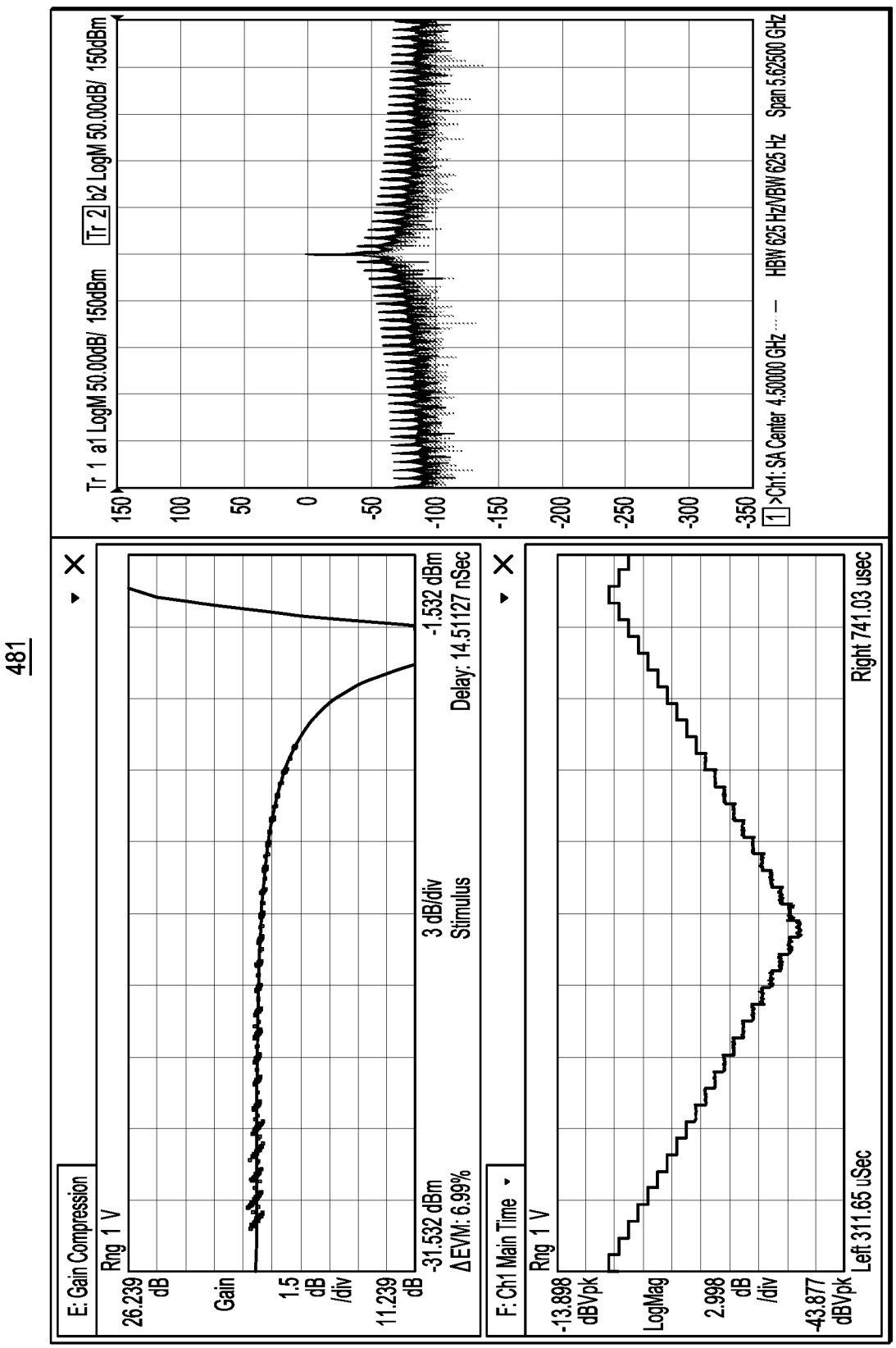
FIG. 4 illustrates a user interface for RF distortion analysis and gain compression characterization based on waveform creation, in accordance with a representative embodiment.

FIG. 4 illustrates a user interface for RF distortion analysis and gain compression characterization based on waveform creation, in accordance with a representative embodiment. It is noted that in the following description of a representative embodiment, a single example frequency and power range are provided to illustrate a method according to the present teachings. This illustrative method is contemplated be performed at other frequency ranges and at variety of power ranges and levels.

The upper left-hand trace of FIG. 4 shows an amplifier device being driven into compression by the waveform created using the algorithm described in FIG. 9. In some embodiments, a RF mixer may be driven into compression using the IQ baseband waveform data array described herein. The trace in the lower left-hand corner of the display is the time domain representation of the power stepped continuous waveform tone IQ waveform. The righthand portion of the display shows the frequency domain representation of power stepped continuous wave tone waveform as sampled by receivers on the vector network analyzer. The observations from FIG. 4 demonstrates that a device under test may be driven into compression using the power stepped IQ waveform and the compression can be observed using the measurement technique outlined herein. That is, the upper left trace shows the observation of the device under test compression in a gain compression graph of a vector signal analysis program, demonstrating that the device under test is being driven into compression by the power step waveform displayed in the lower left-hand side. The lower left-hand trace, trace E, shows the time domain representation of the waveform captured by the vector network analyzer and processed by the vector signal analysis software using the vector signal analysis link in the vector network analyzer application. On the right hand side of the display, traces a1 and b2 are the frequency domain representation of the power step continuous wave tone waveform sampled by the reference and test receivers of the vector network analyzer.

Figure 5:
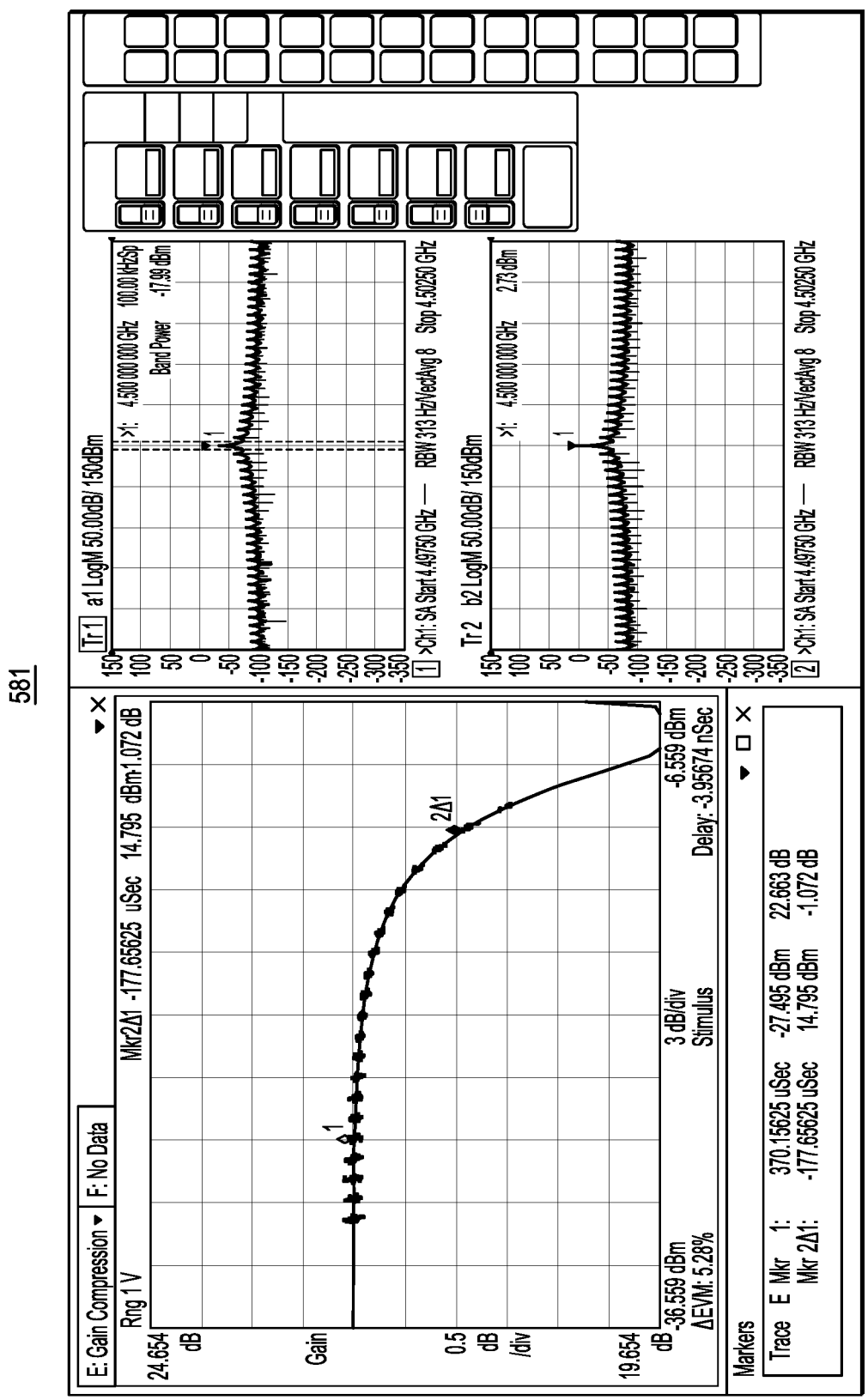
FIG. 5 illustrates another user interface for RF distortion analysis and gain compression characterization based on waveform creation, in accordance with a representative embodiment.

FIG. 5 illustrates another user interface for RF distortion analysis and gain compression characterization based on waveform creation, in accordance with a representative embodiment.

FIG. 5 illustrates a vector signal analysis and vector network analyzer layout used to observe the 1 dB compression point of the dual amplifier device under test analyzed in the example of FIG. 4. A power stepped continuous wave tone waveform for the example of FIG. 4 is shown in FIG. 10A and FIG. 10B. As noted above, in the following description of a representative embodiment, a single example frequency and power range are provided to illustrate a method according to the present teachings. This illustrative method is contemplated be performed at other frequency ranges and at variety of power ranges and levels.

To validate the extension of the measurement techniques described in using such a power stepped continuous wave waveform, to enable the measurement of gain and phase compression levels of RF-digital devices using the measurement techniques based on the method in FIG. 3, a set of simple gain compression measurements may be performed. Baseline observations of the 1 dB gain and 0.5° phase compression points at 4.5 GHz may be obtained using gain compression and standard measurement applications. With the gain and phase compression parameters determined using these measurement applications, the device performance of similar parameters may be characterized using the method of FIG. 3. The 1 dB gain and 0.5° phase compression points at 4.5 GHz for the combined amplifier device under test obtained using various sweep methods in a gain compression measurement application are summarized in Table 1. In all cases the compression method selected was compression from linear gain. The phase compression point was obtained by adjusting the span used in computing linear power to 5%.

TABLE 1

| Gain Compression Application Data Acquisition Mode Setting | Input Power to Achieve 1 dB Gain Compression at 4.5 GHz | Input Power to Achieve 0.5° Phase Compression at 4.5 GHz |
|---|---|---|
| SMART Sweep | −13.17 dBm | Not available |
| Sweep Power Per Frequency (2D) | −12.85 dBm | −15.82 dBm |
| Sweep Frequency Per Power (2D) | −12.84 dBm | −13.82 dBm |
| Average Result | −12.95 + 0.30 dBm | −14.8 + 2 dBm |

Table 1 above shows a summary of 1 dB gain and 0.5° phase compression input power levels observed with a gain compression measurement application. Similar observations of these gain and phase compression points for the amplifier device under test may be performed using a power stepped continuous wave waveform generated using the method of FIG. 9. The 1 dB gain and 0.5° phase compression input power levels on the example device under test may be observed using the power stepped IQ waveform. The screen layout that may be used is shown in FIG. 5. The waveform used to stimulate the device under test is the waveform shown in FIG. 4.

Figure 6:
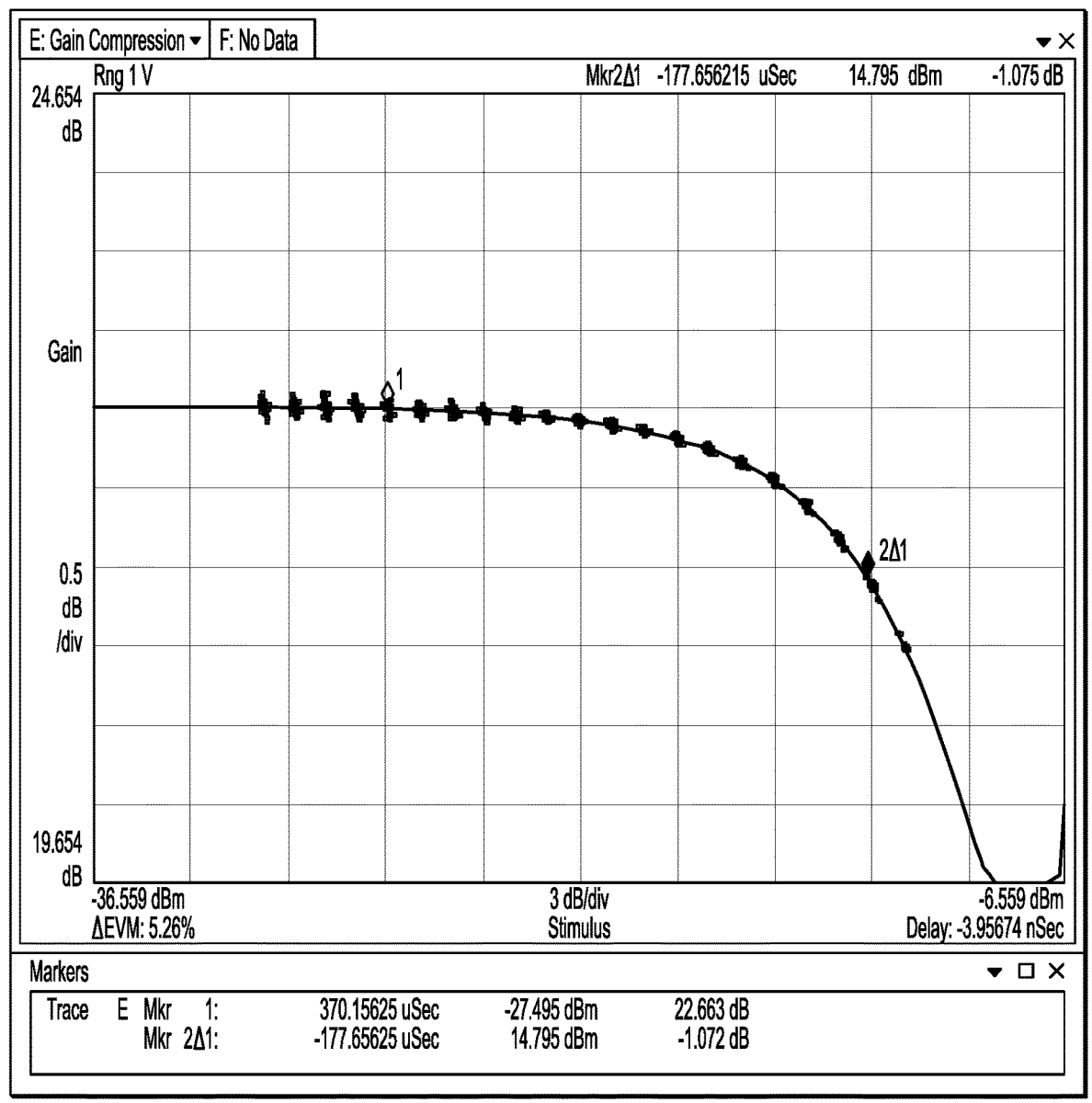
FIG. 6 illustrates another user interface for RF distortion analysis and gain compression characterization based on waveform creation, in accordance with a representative embodiment.

FIG. 6 illustrates another user interface for RF distortion analysis and gain compression characterization based on waveform creation, in accordance with a representative embodiment.

FIG. 6 highlights the vector signal analysis gain compression graph portion of display shown in FIG. 5. By setting a marker, Marker 1, to the region of power steps that are in the non-compressed operating region of the amplifier device under test system and setting a second marker, Marker 2, in area of operation at which 1 dB of compression was observed, the 1 dB gain compression point may be computed. For ease of locating the approximate 1 dB gain compression point and calculation of the input level required to achieve this point, Marker 2 may be set to be relative to Marker 1. This is noted as 2Δ1 in FIG. 5 and FIG. 6. Using the Marker 2Δ1 stimulus delta value of 14.795 dBm and the Marker 1 stimulus value of −27.495 dBm, shown in the marker table in FIG. 6, the input level of −12.67 dBm is observed.

FIG. 6 shows the display of a vector signal analysis screen. The 1 dB gain compression point is marked with the marker labeled 2Δ1. By using the AM/PM graph type available in vector signal analysis software, the phase compression of the device under test may be observed.

Figure 7A:
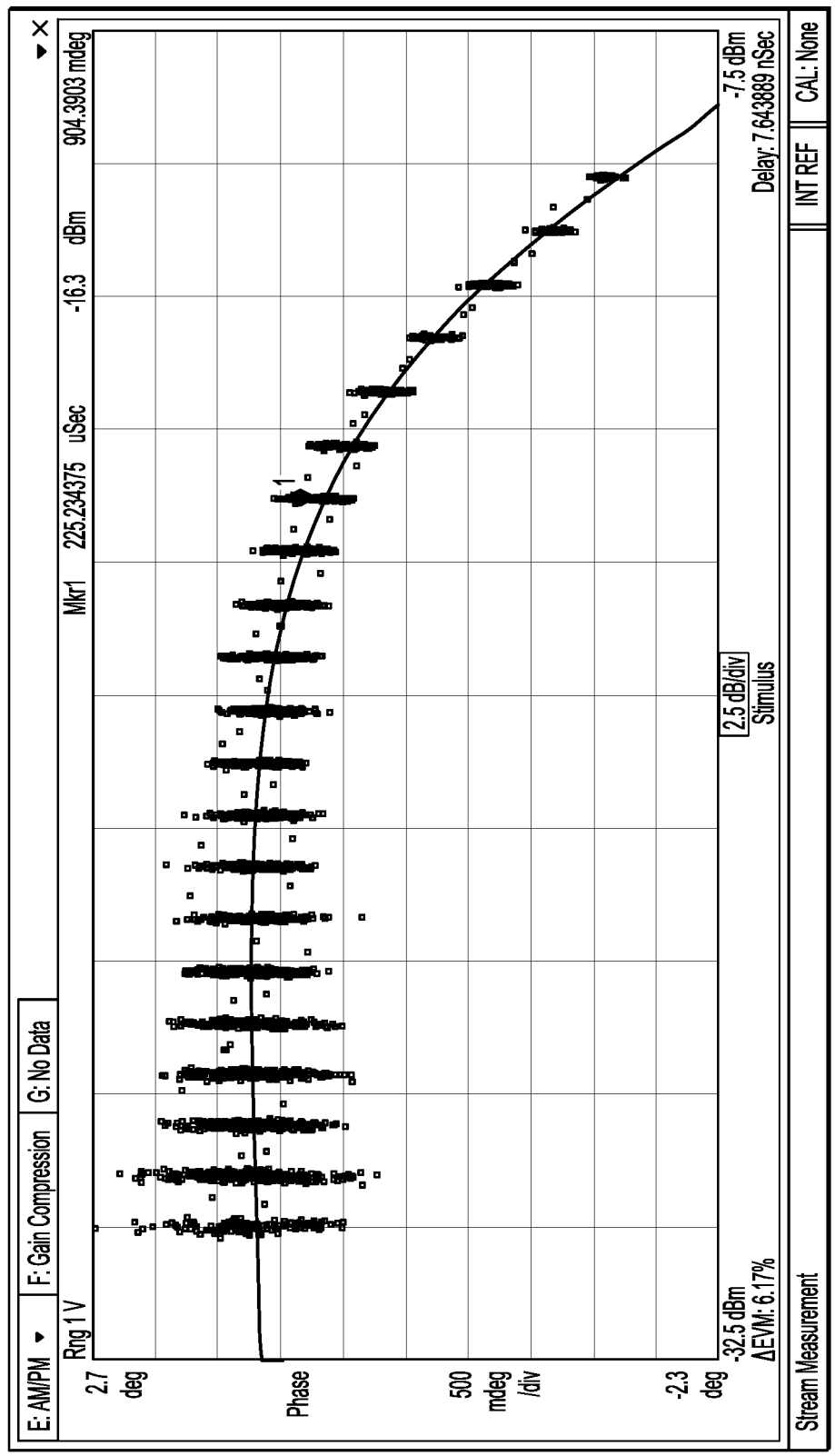
FIG. 7A illustrates another user interface for RF distortion analysis and gain compression characterization based on waveform creation, in accordance with a representative embodiment.

FIG. 7A illustrates another user interface for RF distortion analysis and gain compression characterization based on waveform creation, in accordance with a representative embodiment. Again, in the following description of a representative embodiment, a single example frequency and power range are provided to illustrate a method according to the present teachings. This illustrative method is contemplated be performed at other frequency ranges and at variety of power ranges and levels are contemplated. It is again emphasized that in the following description of a representative embodiment, a single example frequency and power range are provided to illustrate a method according to the present teachings. This illustrative method is contemplated be performed at other frequency ranges and at variety of power ranges and levels.

Figure 7B:
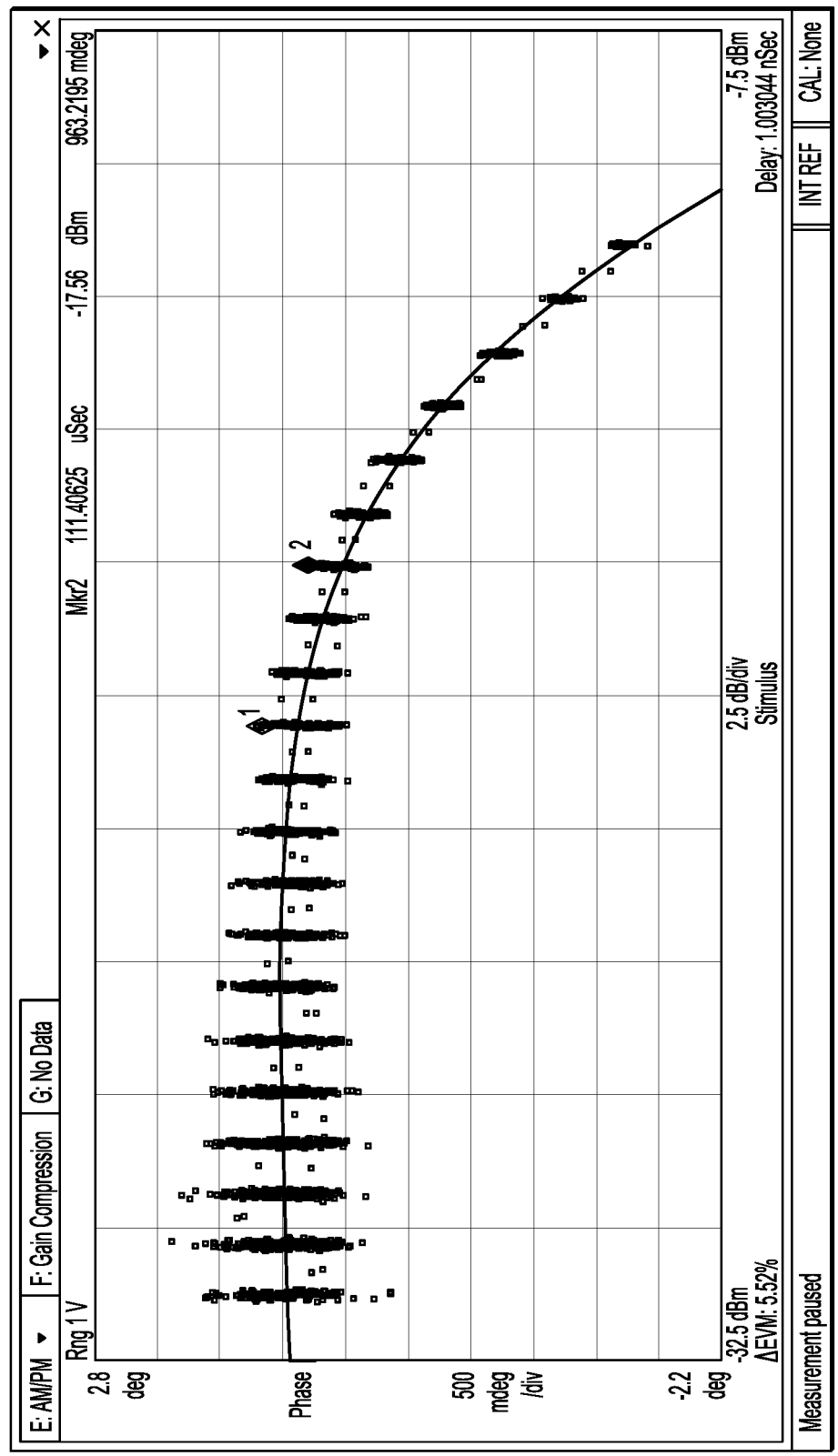
FIG. 7B illustrates another user interface for RF distortion analysis and gain compression characterization based on waveform creation, in accordance with a representative embodiment.

FIG. 7B illustrates another user interface for RF distortion analysis and gain compression characterization based on waveform creation, in accordance with a representative embodiment.

The result of disabling a phase error compensation function in the vector signal analysis software is shown in FIG. 7A. From FIG. 7A, the 0.5° phase compression point may be estimated to be at approximately −16.3 dBm. The trace shown in FIG. 7A is acquired with the error corrections disabled. When the vector network analyzer error corrections are applied, the observation of the 0.5° phase compression point changes to be at approximately −17.6 dBm, as shown in FIG. 7B. The results of the 1 dB gain and 0.5° phase compression points observations made using the vector network analyzer with vector signal analysis link and the vector signal analysis software VSA software are summarized in Table 2.

TABLE 2

| Input Power to Achieve 1 dB Gain Compression at 4.5 GHz using VSA | Input Power to Achieve 0.5° Phase Compression at 4.5 GHz Using VSA |
| --- | --- |
| −12.67 dBm | −7.56 dBm |

Figure 8:
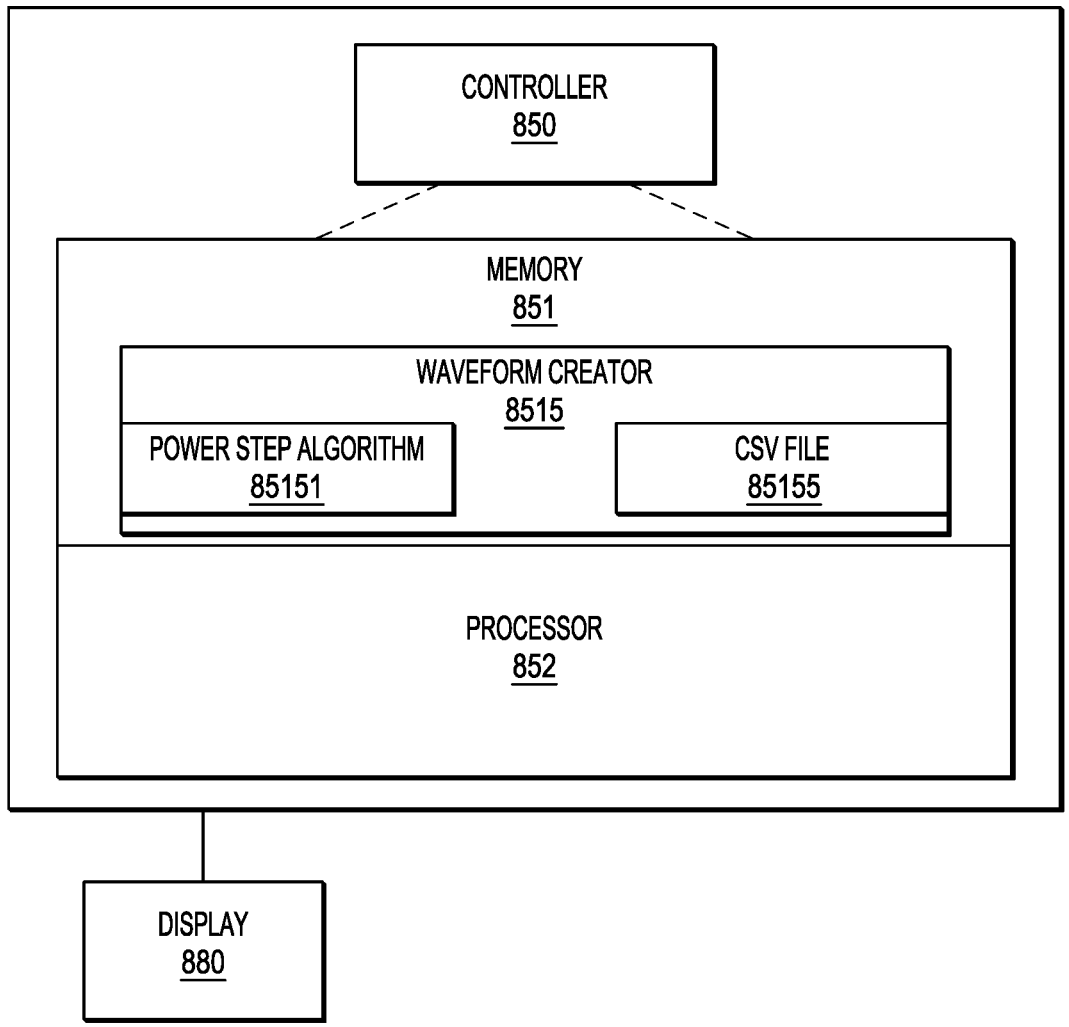
FIG. 8 illustrates a system for waveform creation for RF distortion analysis and gain compression characterization, in accordance with a representative embodiment.

FIG. 8 illustrates a system for waveform creation for RF distortion analysis and gain compression characterization, in accordance with a representative embodiment.

The system 800 in FIG. 8 includes a controller 850 and a display 880. The controller 850 includes a memory 851 and a processor 852. The memory 851 stores a waveform creator 8515. The waveform creator 8515 includes a power step algorithm 85151 and a CSV file 85155. The memory 851 also stores instructions in addition to the waveform creator 8515. The processor 852 executes the instructions.

The controller 850 may also include interfaces, such as a first interface, a second interface, a third interface, and a fourth interface. One or more of the interfaces may include ports, disk drives, wireless antennas, or other types of receiver circuitry that connect the controller 850 to other electronic elements. One or more of the interfaces may include user interfaces such as buttons, keys, a mouse, a microphone, a speaker, a display separate from the display 880, or other elements that users can use to interact with the controller 850 such as to enter instructions and receive output. The controller 850 may perform some of the operations described herein directly and may implement other operations described herein indirectly. For example, the controller 850 may indirectly control operations such as by generating and transmitting content to be displayed on the display 880. The controller 850 may directly control other operations such as logical operations performed by the processor 852 executing instructions from the memory 851 based on input received from electronic elements and/or users via the interfaces. Accordingly, the processes implemented by the controller 850 when the processor 852 executes instructions from the memory 851 may include steps not directly performed by the controller 850.

The waveform creator 8515 is representative of a utility application developed to quickly and easily generate waveforms that can be used with measurement techniques to enable the characterization of the distortion properties of RF-digital receiver, transmitter, and transceiver devices. The waveform creator 8515 is used to create IQ waveforms that have characteristics of a continuous waveform tone that is changing amplitude in time in a stepwise fashion. The IQ waveforms created by the waveform creator 8515 enable techniques that can be used to characterize simple gain compression characteristics of RF-digital devices using coherent spectral analysis techniques. The gain and phase compression measurements made using these techniques correlate to results made using vector network analyzer gain compression measurement techniques.

The display 880 may be connected to the controller 850 via a local wired interface. The display 880 and/or one or more other element(s) of the system 800 may be interfaced with other user input devices by which users can input instructions, including mouses, keyboards, thumbwheels and so on. The display 880 may also include an interactive touch screen configured to display prompts to users and collect touch input from users.

When executed by the processor 852, the waveform creator 8515 from the memory 851 causes the system 800 to: obtain inputs including a number of steps, a size of the steps, a duration of the steps, and a waveform sample rate; reconcile the duration of the steps against the waveform sample rate to ensure a number of samples per step is an integer number; compute a list of power levels based on the number of steps and the size of the steps; convert the list of power levels to a list of voltage levels; create a first array for I data based on the voltage levels; create a second array for Q data so that a length of the first array matches a length of the second array; and combine the first array and the second array to create an IQ baseband waveform data array. The IQ baseband waveform data array may be stored in the memory 851 by the waveform creator 8515 as the CSV file 85155. The IQ baseband waveform data array may be used to characterize the gain in a modulated signal, an error vector magnitude (EVM) in the modulated signal, and a group delay introduced by a device under test in the modulated signal. The IQ baseband waveform data array may be used with various wideband multi-tone modulated signals. As one example, the ability to characterize the gain in a modulated signal enables characterization of gain compression parameters such as the stimulus levels at which gain compression or phase compression or expansion occur. The IQ baseband waveform data array may be used to observe how a device under test behaves with or responds to an input signal or output signal that changes amplitude over time.

FIG. 9 illustrates a method for waveform creation for RF distortion analysis and gain compression characterization, in accordance with a representative embodiment.

The method of FIG. 9 may be performed by the system 800 including the controller 850. In order to enable the measurement techniques described herein, a device under test is driven into compressed operating conditions. In traditional vector network analyzer measurement methodologies this can be done by changing the RF power amplitude at a given stimulus frequency. When using the existing measurement applications available on existing vector network analyzers this may be handled automatically for the user by the application depending on the channel setup conditions. However, if the device under test is a cross-domain device such as a digital-RF receiver device, then traditional vector network analyzer measurement methodologies are not possible due to the lack of ability to continuously acquire and update the vector network analyzer with the device under test's acquired waveform that is responsive to the stimulus provided by the vector network analyzer. With the teachings herein, a suitable IQ waveform compatible with the coherent spectral analysis acquisition of the vector network analyzer can be calculated and this serves as a basis for the method of FIG. 9.

The method starts at S905 by receiving inputs. The inputs obtained at S905 may include a number of steps, a size of the steps, a duration of the steps, and a waveform sample rate. The number of steps may correspond to a count of discrete and differentiable horizontal levels of a waveform being created by the method in FIG. 9, whereas the size of the steps may correspond to the vertical difference between adjacent steps. A duration of the steps may correspond to a horizontal length of each of the steps. The algorithm to generate an IQ waveform usable to modulate an RF vector source under the conditions described herein uses the four inputs. matching these conditions. The number of steps corresponds to the number of power levels desired. The desired change in RF power between levels corresponds to the size of the steps. The duration of the steps corresponds to the desired time to spend or dwell at each power level. These four pieces of information are requested from the user via entries displayed on the user interface in the waveform creator 8515 shown in FIG. 8, when the user selects to create the waveform type for power step continuous waveform tone. Using the desired inputs received from the user the power stepped continuous waveform tone IQ waveform is calculated in the method of FIG. 9.

Although not specified in FIG. 9, the system 800 may output a prompt of selection of types of tones for the IQ baseband waveform data array. The system 800 may obtain a selection of one of the types of tones for the IQ baseband waveform data array.

At S910, step dwell time is reconciled with the sample rate. The duration of the steps may be reconciled against the waveform sample rate to ensure a number of samples per step is an integer number.

At S915, a determination is made whether to update the dwell time based on the reconciliation at S910. The determination at S915 may involve confirming whether the number of samples per step is an integer number.

If the dwell time is to be updated (S915=Yes), the process returns to S905 to again receive inputs. In some embodiments, an updated duration of the steps may be provided when the number of samples per step is not an integer number, and updated inputs may be updated when the process returns to S905. The updated inputs may include an updated number of steps, an updated size of the steps, and an updated waveform sample rate.

If the dwell time is not to be updated (S915=No), at S920 a list of power levels is computed. The list of power levels is computed at S920 based on the number of steps and the size of the steps. The generation of the list of discrete amplitude levels for the IQ data pairs in the waveform may use a set of arbitrary power levels starting from 0 dBm and iteratively calculating the discrete levels based on the input total number of amplitude levels and step change magnitude. These two properties are obtained from entries such as for a "Number of Levels" and "Power Step Size". For example, if the user enters values in the entries corresponding to 21 levels and a power step size of 1 dB, a list of power levels will be generated that will be a list of values 0, 1, 2, 3, . . . , 20 dBm. S920 may also include computing and appending to the list a set of decreasing power levels in a similar fashion as the set of increasing amplitude levels. However, the iterative loop for calculating the set of decreasing amplitudes may be adjusted slightly such that the calculation begins one discrete amplitude level down from the calculated stop, or maximum, amplitude level. The iterative loop for calculating the set of decreasing amplitudes may also stop calculating the discrete levels once a number of levels corresponding to one step before the minimum or starting amplitude level is reached. In some embodiments, the minimum and maximum power level are not repeated at the end or mid points, respectively, in the list to avoid continuously stimulating the device under test with an amplitude for twice as long at these amplitude points than the device under test experiences in time any other amplitude level. Thus, the final list of power computed at S920 may include the set of numerical values 0, 1, 2, 3, . . . , 20, 19, 18, 17, . . . , 1 dBm. The initial amplitude level of 0 dBm and units of dBm for this step in the algorithm are used as a mathematical convenience and do not correspond to the actual start and stop power levels that will be experienced by the device under test. These levels and the power range that is used to stimulate the device under test may be defined by the output amplitude setting of the RF source that will be modulated by the waveform created using the method of FIG. 9 at the time of measurement. The programmatic implementation of the method of FIG. 9 supports specifying specific start and stop powers and generating the levels based on that range by automatically adjusting the step size to accommodate the desired number of steps. Additionally, the waveform creator 8515 may communicate with or control an external vector RF source.

Additionally, S920 may include generating the individual time domain IQ samples that will make up the waveform. This is accomplished by first determining the number of samples required for each discrete amplitude level to achieve the set step dwell time. This value is obtained from a value specified in an entry such as "Dwell Time" in a user interface on the display 880. The number of samples for each discrete amplitude level is given by equation (1) as follows:

$$\text{LevelNumberOfSamples} = \text{StepDwellTime} * \text{WaveformSampleRate} \quad (1)$$

The product computed from equation (1) may be rounded to the nearest integer.

At S930, the list is converted. The list of power levels is converted at S930 to a list of voltage levels. The method of FIG. 9 includes using the list of discrete amplitude levels, in units of dBm, that was calculated previously and converting to discrete voltage levels. For example, a 50Ω characteristic impedance may be assumed when converting to the discrete voltage levels.

At S940, the converted list is normalized. The list of voltage levels is normalized so that the first array for I data is created based on scaled voltage values by repeating each scaled value a number of times required to achieve the duration of the steps given the waveform sample rate. Once the list of discrete voltage levels is calculated it is then normalized to the maximum voltage in the list, creating a list of values for the discrete values that will be used for the I portion of the IQ samples in the waveform.

At S950, an array is created. The array created at S950 may be a first array for I data, and may be created based on the voltage levels as normalized at S940. At S950, the method of FIG. 9 implemented using the waveform creator 8515 creates a new array for the I portion of the IQ samples by iterating through the list of individual I levels. The array may be created by repeating each value of a particular level in the array the number of times specified by the integer rounded result from Equation 1. The result of this is a first array that has all of the I value components for the IQ samples that make up the entire waveform.

At S960 an equal length array is created. The equal length array created at S960 may be a second array for Q data. The second array is created so that a length of the first array from S950 matches a length of the second array created at S960. An array of the Q component of the IQ sample for the waveform may be specified as 0.0 and the second array may be generated to be the same length as the I component array.

At S970, the array from S950 and the equal length array from S960 are combined. The combination of the first array from S950 and the second array from S960 results in creation of an IQ baseband waveform data array. The IQ baseband waveform data array may be created based on the selection of one of the types of tones for the IQ baseband waveform data array. The first array and the second array may be combined in the form of a list tuple data structures where each tuple element consists of two double values corresponding to the I components and Q components of the IQ sample in the waveform. At or after S970, the list of IQ samples may be formatted.

At S980, an output file is written. The output file may be written as the CSV file 15155 in FIG. 1. The CSV file 15155 may be written for a vector network analyzer or a device under test based on the IQ baseband waveform data array and written to the disk or other permanent computer storage medium. The waveform may be formatted in CSV format so that the waveform can be displayed or modified by a basic text editor or spreadsheet program. Header information specific to enable use by a spectrum analyzer or modulation distortion application, such as the waveform sample rate, may be added to the header of the resulting CSV file. An example waveform showing the (a) time domain representation and (b) frequency domain representation of the waveform is shown in FIG. 10A and FIG. 10B.

The analyzer 210 in FIG. 2A or FIG. 2B is therefore enabled to interpret and playback a waveform using a source capable of vector modulation. That is, the IQ baseband waveform data array may be configured interpreted by a vector modulated source when provided by a vector network analyzer or similar device such that the vector modulated source provides a modulated RF signal to the vector network analyzer based on the IQ baseband waveform data array. The up conversion to the desired RF frequency is handled directly by the RF vector source. The device under test may be enabled to interpret and playback a waveform by itself. That is, the IQ baseband waveform data array is configured to be interpreted by the device under test such that the device under test provides a modulated RF signal to the vector network analyzer based on the IQ baseband waveform data array. The modulated RF signal based on the IQ baseband waveform data array is used by a vector network analyzer to characterize at least one of gain compression characteristics of a device under test or phase compression characteristics of the device under test.

The output CSV file may be written for a signal analysis device based on the IQ baseband waveform data array so that the signal analysis device can interpret and playback a waveform using a source capable of vector modulation. An example of a source capable of vector modulation is the vector modulated source 290 in FIG. 2A.

Notably, the IQ baseband waveform data array may be created in the method of FIG. 9 for testing a device under test with a digital interface and at least one of a RF input or a RF output. That is, the IQ baseband waveform data array may be created for testing a device under test (device under test) with cross-domain configurations including a digital interface and at least one of a RF input or a RF output. Such devices under test may have one or more RF input, one or more RF output, or both one or more RF input and one or more RF output. Such devices under test also have a digital interface which may include one or more digital input, one or more digital output, or both one or more digital input and one or more digital output. For example, the IQ baseband waveform data array may be created for testing digital-RF converting devices having a combination of a RF front end and a digital baseband back end. RF components and RF-digital cross domain receiver devices may be driven into compression, and the IQ baseband waveform data array enables characterization of such components and receiver devices in such conditions. For example, the IQ baseband waveform data array may be used to measure 1 dB gain compression and 0.5° phase compression points of a commercially available RF amplifier. The IQ baseband waveform data array may be configured to drive a RF amplifier or a RF mixer, either as stand-alone components or as components of devices under test. Digital-RF converting devices and digital-RF transceivers may therefore be tested using the IQ baseband waveform data array created by methods based on FIG. 9.

FIG. 10A illustrates a frequency domain representation of a waveform created via a user interface for RF distortion analysis and gain compression characterization based on waveform creation, in accordance with a representative embodiment. FIG. 10B illustrates a time domain representation of a waveform created via a user interface for RF distortion analysis and gain compression characterization based on waveform creation, in accordance with a representative embodiment.

The user interface 1081 may be displayed on the display 880 in FIG. 8. An example time domain representation of a power stepped continuous waveform tone waveform generated using the waveform creator 8515 is shown in FIG. 10B next to the frequency domain representation of the same waveform shown in FIG. 10A. The representations in FIG. 10A and FIG. 10B may be shown simultaneously or individually. For the purposes of the waveform creator 8515, the carrier frequency information shown in FIG. 10A and FIG. 10B may be used for visual purposes only unless otherwise overridden by the user using a hidden application setting. No particular limits are placed on the power step size or the power range for the waveform as the resolution between power steps and power range possible may depend on each individual source that could be used and the waveform creator 8515 is agnostic to the RF vector source that will be used to play back the waveform. The waveform creator 8515 may serve in a mathematical computation capacity. The waveform in FIG. 10A and FIG. 10B may be created with 90 million samples per second sample rate, centered at a 2 Gigahertz (GHz) carrier frequency, with 21 levels, and 1 dB change in amplitude between steps, though these values are illustrative for an example waveform and the waveform creator 8515 may create waveforms with different carrier frequencies, numbers of levels, step sizes and other variables.

The entry for the number of levels is used to specify the number of "one-way" power levels that will be calculated for the overall power stepped continuous waveform tone waveform. The entry for the power step size is used to calculate the amplitude change in the IQ pair between the power levels. These two values are used in conjunction in calculating the value displayed in the power range entry. If the user adjusts the power range entry directly the power step size entry may be adjusted programmatically to remain consistent with the specified number of levels over the power range entered by the user. The dwell time specifies the length of time for each amplitude level requested in the waveform.

Once the various waveform parameters are provided by the user the waveform may be calculated by clicking a "Calculate" button available in a main window of a user interface displayed on the display 880. For the selection of "Power Stepped CW Tone" waveform type the waveform calculation and generation is handled internally by the waveform creator 8515 and does not require a connection to a vector network analyzer.

Figure 11A:
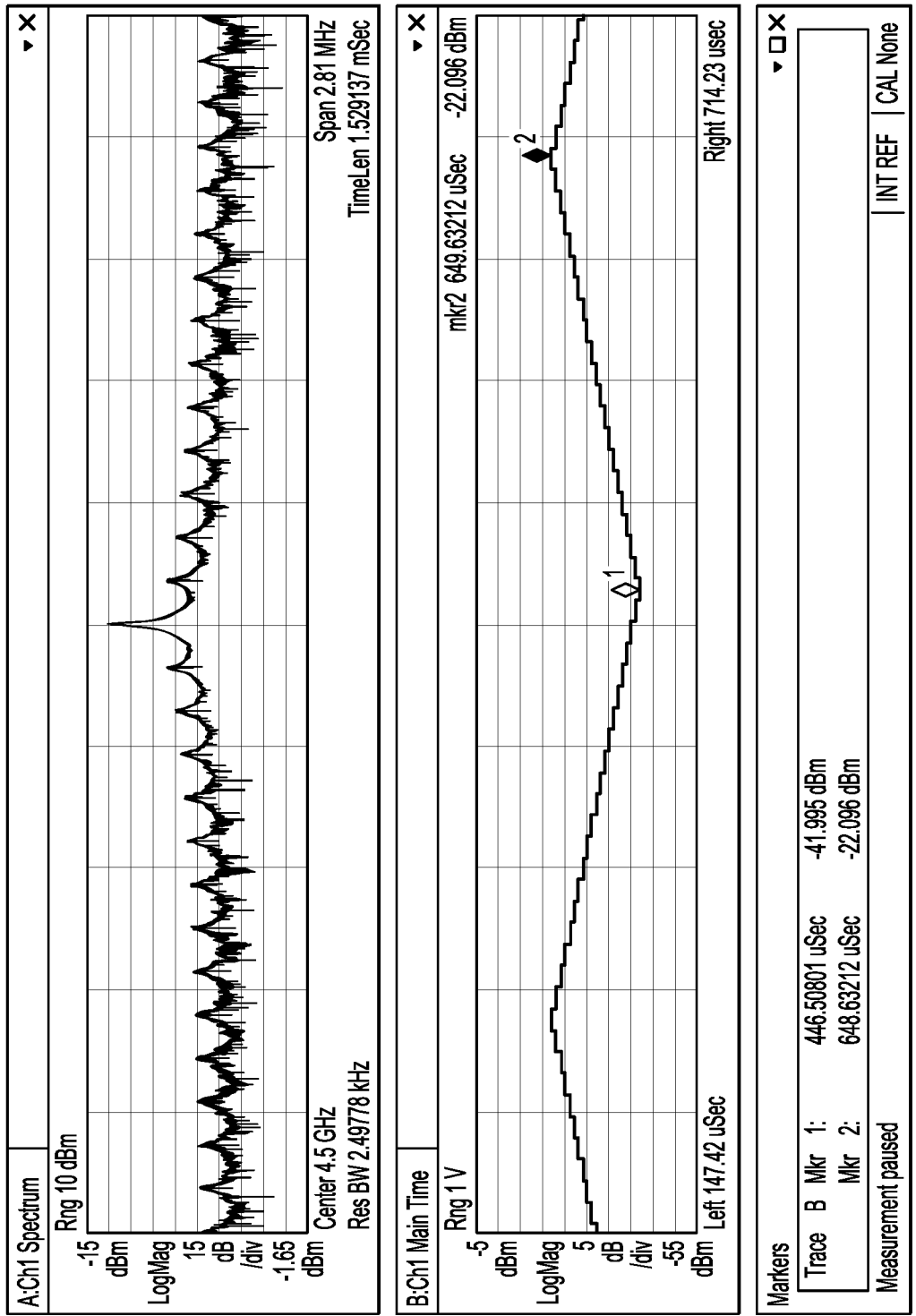
FIG. 11A illustrates observed start and stop power levels at a first RF source power setting on a user interface for RF distortion analysis and gain compression characterization based on waveform creation, in accordance with a representative embodiment.
Figure 11B:
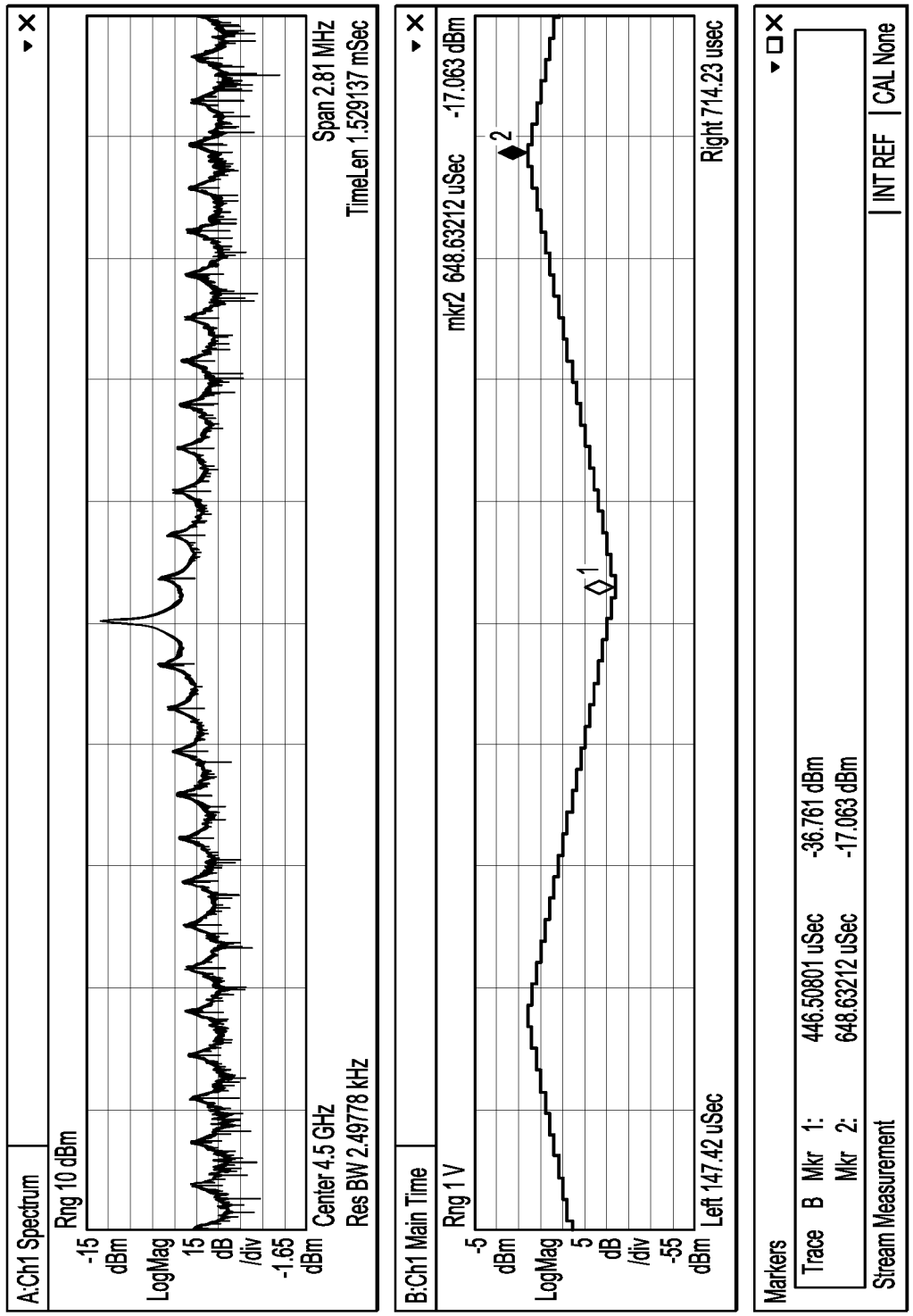
FIG. 11B illustrates observed start and stop power levels at a second RF source power setting on a user interface for RF distortion analysis and gain compression characterization based on waveform creation, in accordance with a representative embodiment.

FIG. 11A illustrates observed start and stop power levels at a first RF source power setting on a user interface for RF distortion analysis and gain compression characterization based on waveform creation, in accordance with a representative embodiment. FIG. 11B illustrates observed start and stop power levels at a second RF source power setting on a user interface for RF distortion analysis and gain compression characterization based on waveform creation, in accordance with a representative embodiment.

The user interface 1181 shown in each of FIG. 11A and FIG. 11B may be displayed on the display 880 in FIG. 8. In FIG. 11A, a RF source power is set to −10.0 dBm and the observed start and stop power levels when RF source is modulated using the baseband IQ power step CW tone waveform is shown. In FIG. 11B, a RF source power is set to −5.0 dBm and the observed start and stop power levels when RF source is modulated using the baseband IQ power step CW tone waveform is shown. The start and stop power levels may be controlled by changing the RF power level on the vector source being modulated with the IQ waveform. This source RF level corresponds to the integrated average power level of the waveform. FIG. 11A and FIG. 11B illustrate the change in start and stop levels as a function of the RF amplitude setting on the vector RF source being modulated with the same baseband IQ waveform shown in FIG. 10A and FIG. 10B.

In the observations shown in FIG. 11A and FIG. 11B, a source power calibration was not performed, so the system losses were not corrected.

Despite the uncompensated power losses, a difference of approximately 20 dB was shown in the observations summarized in Table 3, showing excellent agreement with the IQ waveform generated using the method of FIG. 3 and shown in FIG. 6A and FIG. 6B with 21 levels with a 1 dB change in amplitude between levels. Additionally, the change in RF power from setting to setting tracks with the 5 dB changes in output power requested of the RF source with 0.2 dB. The observations of the start and stop power levels as a function of the vector source power level are summarized in Table 3 below:

TABLE 3

| RF Source Carrier Frequency | RF Source Power Level Setting | Observed Start (Minimum) Power Level | Observed Stop (Maximum) Power Level | Observed Power Range |
|---|---|---|---|---|
| 4.5 GHz | −10 dBm | −41.995 dBm | −22.096 dBm | 19.9 dB |
| 4.5 GHz | −5 dBm | −36.761 dBm | −17.063 dBm | 19.7 dB |
| 4.5 GHz | 0 dBm | −31.692 dBm | −11.915 dBm | 19.8 dB |

As described herein, electronic equipment such as computers, vector network analyzers, vector modulated RF sources and devices under test may be used to implement RF distortion analysis and gain compression characterization based on waveform creation. In some embodiment, dedicated hardware implementations, such as application-specific integrated circuits (ASICs), field programmable gate arrays (FPGAs), programmable logic arrays and other hardware components, are constructed to implement one or more of the methods described herein. One or more embodiments described herein may implement functions using two or more specific interconnected hardware modules or devices with related control and data signals that can be communicated between and through the modules. Accordingly, the present disclosure encompasses software, firmware, and hardware implementations. Nothing in the present application should be interpreted as being implemented or implementable solely with software and not hardware such as a tangible non-transitory processor and/or memory.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing may implement one or more of the methods or functionalities as described herein, and a processor described herein may be used to support a virtual processing environment.

Accordingly, RF distortion analysis and gain compression characterization based on waveform creation enables characterization of behavior exhibited by digital-RF converting devices and digital-RF transceivers with RF components and digital interfaces. The measurement techniques described herein provide a capability to measure gain compression figures of merit of compact RF to digital (RF-Digital) cross-domain devices. The teachings herein are capable of working with devices that have a single RF input or output and digital output or input, and do not require reliance on traditional vector network analyzer methods requiring both a RF input and a RF output. The techniques describe herein may be used to measure the gain compression of a device using a modulated waveform that is constructed of discrete power levels and which is capable to drive a device under test into non-linear operating conditions.

Although RF distortion analysis and gain compression characterization based on waveform creation has been described with reference to several exemplary embodiments, it is understood that the words that have been used are words of description and illustration, rather than words of limitation. Changes may be made within the purview of the appended claims, as presently stated and as amended, without departing from the scope and spirit of RF distortion analysis and gain compression characterization based on waveform creation in its aspects. Although RF distortion analysis and gain compression characterization based on waveform creation has been described with reference to particular means, materials and embodiments, RF distortion analysis and gain compression characterization based on waveform creation is not intended to be limited to the particulars disclosed; rather RF distortion analysis and gain compression characterization based on waveform creation extends to all functionally equivalent structures, methods, and uses such as are within the scope of the appended claims.

The illustrations of the embodiments described herein are intended to provide a general understanding of the structure of the various embodiments. The illustrations are not intended to serve as a complete description of all of the elements and features of the disclosure described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72 (b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The preceding description of the disclosed embodiments is provided to enable any person skilled in the art to practice the concepts described in the present disclosure. As such, the above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents and shall not be restricted or limited by the foregoing detailed description.

The invention claimed is:

1. A controller, comprising:
   a memory that stores instructions; and
   a processor that executes the instructions, wherein, when executed by the processor, the instructions cause the processor to:
   provide a waveform based on an in-phase/quadrature (IQ) baseband waveform data array;
   initialize a signal analysis device to acquire a modulated radio frequency signal which is based on the IQ baseband waveform data array;
   control the signal analysis device to measure the modulated radio frequency signal which is based on the IQ baseband waveform data array; and
   obtain graph polynomial fit coefficients corresponding to measurements of the modulated radio frequency signal which is based on the IQ baseband waveform data array.

2. The controller of claim 1, wherein, when executed by the processor, the instructions further cause the controller to:
   obtain inputs corresponding to at least one of a target gain value or a target phase value; and
   apply the target gain value or the target phase value to the graph polynomial fit coefficients corresponding to the measurements so as to characterize a device under test.

3. The controller of claim 2, wherein the modulated radio frequency signal is provided from the device under test to the signal analysis device and is measured by the signal analysis device.

4. The controller of claim 3, wherein the device under test has a digital interface and at least one of a radio frequency input or a radio frequency output.

5. The controller of claim 1, wherein processing of the modulated radio frequency signal by the signal analysis device comprises at least one of spectrum analysis or modulation distortion analysis.

6. The controller of claim 1, wherein the IQ baseband waveform data array is configured to drive at least one of a radio frequency amplifier or a radio frequency mixer.

7. A tangible non-transitory computer-readable storage medium that stores a computer program, wherein the computer program, when executed by a processor, causes a system to:
   provide a waveform based on an in-phase/quadrature (IQ) baseband waveform data array;
   initialize a signal analysis device to acquire a modulated radio frequency signal which is based on the IQ baseband waveform data array;
   control the signal analysis device to measure the modulated radio frequency signal which is based on the IQ baseband waveform data array; and
   obtain graph polynomial fit coefficients corresponding to measurements of the modulated radio frequency signal which is based on the IQ baseband waveform data array.

8. The tangible non-transitory computer-readable storage medium of claim 7, wherein, when executed by the processor, the computer program further causes the system to:
   obtain inputs corresponding to at least one of a target gain value or a target phase value; and
   apply the target gain value or the target phase value to the graph polynomial fit coefficients corresponding to the measurements so as to characterize a device under test.

9. The tangible non-transitory computer-readable storage medium of claim 8, wherein the modulated radio frequency signal is provided from the device under test to the signal analysis device and is measured by the signal analysis device.

10. The tangible non-transitory computer-readable storage medium of claim 9, wherein the device under test has a digital interface and at least one of a radio frequency input or a radio frequency output.

11. The tangible non-transitory computer-readable storage medium of claim 7, wherein processing of the modulated radio frequency signal by the signal analysis device comprises at least one of spectrum analysis or modulation distortion analysis.

12. A system, comprising:
a memory that stores instructions; and
a processor that executes the instructions, wherein, when executed by the processor, the instructions cause the system to:
provide a waveform based on an in-phase/quadrature (IQ) baseband waveform data array;
initialize a signal analysis device to acquire a modulated radio frequency signal which is based on the IQ baseband waveform data array;
control the signal analysis device to measure the modulated radio frequency signal which is based on the IQ baseband waveform data array; and
obtain graph polynomial fit coefficients corresponding to measurements of the modulated radio frequency signal which is based on the IQ baseband waveform data array.

13. The system of claim 12, wherein, when executed by the processor, the instructions further cause the controller to:
obtain inputs corresponding to at least one of a target gain value or a target phase value; and
apply the target gain value or the target phase value to the graph polynomial fit coefficients corresponding to the measurements so as to characterize a device under test.

14. The system of claim 13, wherein the modulated radio frequency signal is provided from the device under test to the signal analysis device and is measured by the signal analysis device.

15. The system of claim 14, wherein the device under test has a digital interface and at least one of a radio frequency input or a radio frequency output.

16. The system of controller of claim 12, wherein processing of the modulated radio frequency signal by the signal analysis device comprises at least one of spectrum analysis or modulation distortion analysis.

17. A controller, comprising:
a memory that stores instructions; and
a processor that executes the instructions, wherein, when executed by the processor, the instructions cause the processor to:
provide a waveform based on an in-phase/quadrature (IQ) baseband waveform data array;
initialize a signal analysis device to acquire a modulated radio frequency signal which is based on the IQ baseband waveform data array; and
control the signal analysis device to measure the modulated radio frequency signal which is based on the IQ baseband waveform data array, wherein the IQ baseband waveform data array is provided from the controller to the signal analysis device as a comma-separated values file and is created by a process, the process comprising:
receiving inputs including a number of steps, a size of the steps, a duration of the steps, and a waveform sample rate;
reconciling the step duration against the waveform sample rate to ensure a number of samples per step is an integer number;
computing a list of power levels based on the number of steps and the size of the steps;
converting the list of power levels to a list of voltage levels;
creating a first array for I data based on the voltage levels;
creating a second array for Q data so that a length of the first array matches a length of the second array; and
combining the first array and the second array to create the IQ baseband waveform data array.

18. The controller of claim 17, wherein processing of the modulated radio frequency signal by the signal analysis device comprises at least one of spectrum analysis or modulation distortion analysis.

19. The controller of claim 17, wherein the IQ baseband waveform data array is configured to drive at least one of a radio frequency amplifier or a radio frequency mixer.

20. The controller of claim 17, wherein, when executed by the processor, the instructions further cause the controller to:
obtain graph polynomial fit coefficients corresponding to measurements of the modulated radio frequency signal which is based on the IQ baseband waveform data array.

* * * * *